United States Patent
Kanekuni et al.

[11] Patent Number: 5,954,939
[45] Date of Patent: Sep. 21, 1999

[54] ELECTROLYZING APPARATUS AND ELECTROLYZING METHOD FOR ELECTROLYZING FLOWING WATER CONTAINING CHLORINE IONS

[75] Inventors: Nobuhiko Kanekuni; Nobuhiro Shono; Masakatsu Kiyohara; Kenji Tabata; Shuhei Kono; Makoto Hayakawa, all of Kitakyushu, Japan

[73] Assignee: Toto, Ltd., Fukuoka, Japan

[21] Appl. No.: 08/906,259

[22] Filed: Aug. 5, 1997

Related U.S. Application Data

[63] Continuation of application No. 08/586,722, filed as application No. PCT/JP95/01036, May 30, 1995, abandoned.

[30] Foreign Application Priority Data

| May 31, 1994 | [JP] | Japan | 6-139606 |
| Apr. 21, 1995 | [JP] | Japan | 7-132552 |

[51] Int. Cl.$^6$ .................... C02F 1/461
[52] U.S. Cl. ............ 205/742; 205/759; 204/228; 204/275; 204/278
[58] Field of Search ............ 205/742, 759; 204/228, 275, 278

[56] References Cited

U.S. PATENT DOCUMENTS

| 4,248,690 | 2/1981 | Conkling | 205/500 |
| 4,255,246 | 3/1981 | Davis et al. | 204/228 |
| 5,034,110 | 7/1991 | Glore et al. | 204/228 |
| 5,395,492 | 3/1995 | Schoeberl | 205/759 |

FOREIGN PATENT DOCUMENTS

| 971057 | 4/1972 | Canada . |
| 470841 | 2/1992 | European Pat. Off. . |
| 470841A2 | 3/1992 | European Pat. Off. . |
| A-19 27 059 | 5/1970 | Germany . |
| 47-14443 | 4/1972 | Japan . |
| 63-104694 | 5/1988 | Japan . |
| 2-17008 | 5/1990 | Japan . |
| 4-94785 | 3/1992 | Japan . |
| 4-28438 | 5/1992 | Japan . |
| 5-50068 | 3/1993 | Japan . |
| A-6-15276 | 1/1994 | Japan . |

*Primary Examiner*—Arun S. Phasge
*Attorney, Agent, or Firm*—Griffin, Butler, Whisenhunt & Szipl, LLP

[57] ABSTRACT

An electrolyzing apparatus for flowing water containing chlorine ions has an electrolytic cell provided with at least one pair of electrodes, a passage formed between the electrodes, an inlet port and an outlet port communicating the passage, and a power supply for applying voltage across the electrodes.

24 Claims, 14 Drawing Sheets

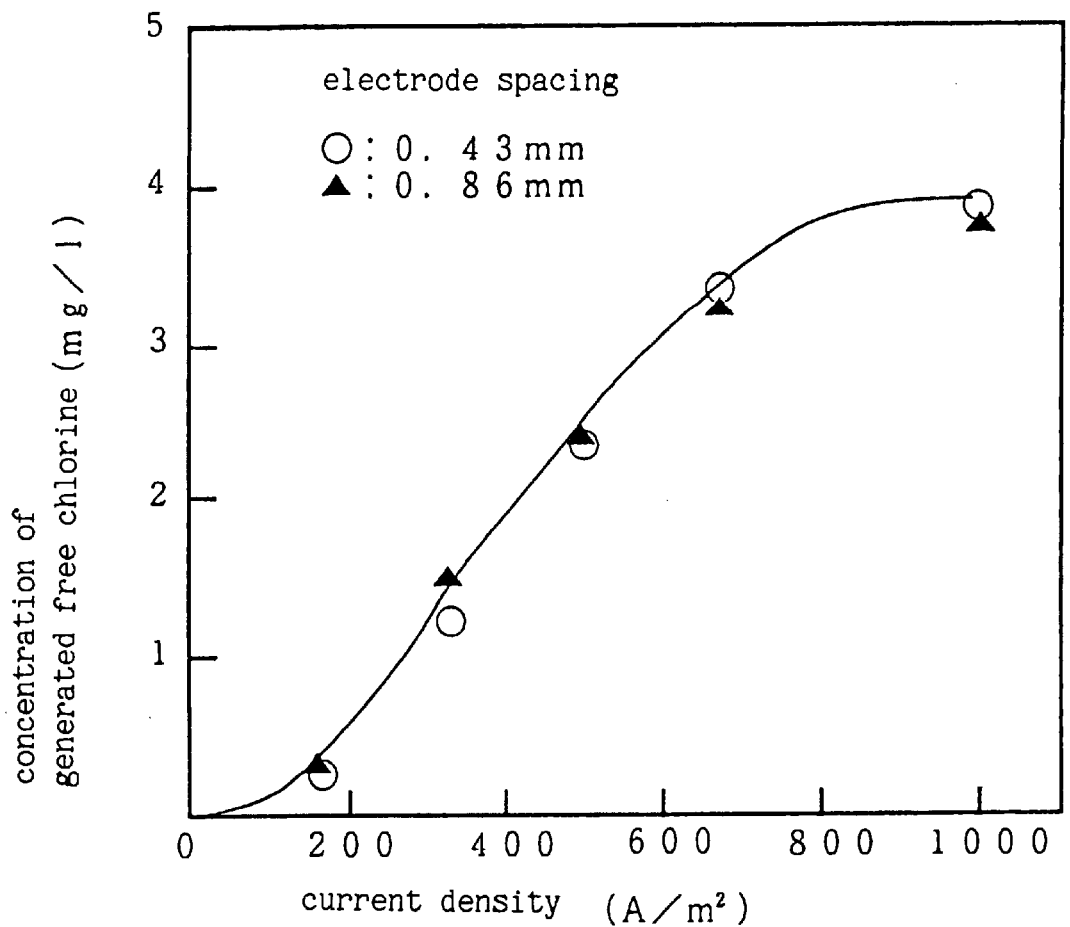

☐ : opposite sides electrodes are positive, center electrode is negative
+ : opposite sides electrodes are negative, center electrode is positive ☐ : opposite sides electrodes are positive, center electrode is negative
+ : opposite sides electrodes are negative, center electrode is positive

ELECTROLYZING APPARATUS AND ELECTROLYZING METHOD FOR ELECTROLYZING FLOWING WATER CONTAINING CHLORINE IONS This application is a continuation of Ser. No. 08/586,722, filed Feb. 23, 1996, now abandonded, which is a 371 of PCT/IP95/01036 filed May 30, 1995.

TECHNICAL FIELD

The present invention relates to an electrolyzing apparatus and an electrolyzing method for electrolyzing flowing water containing a very small amount of chlorine ions, such as city water, industrial water and well water.

BACKGROUND ART

In public water purification plants, sodium hypochlorite which has bactericidal activity, is added to the raw water from the water source to sterilize it. Since sodium hypochlorite is unstable, substantially all of the sodium hypochlorite in the city water reaching homes or offices is already decomposed into chlorine ions. Thus, the city water supplied to the home or the office has only low bactericidal activity. City water having only low bactericidal activity cannot sterilize an outlet port of a kitchen in an office or the home, kitchen utensils such as chopping boards, etc., bath rooms, water closets, etc.

A sanitary system is used in dispensers for mixing feedstocks with water to automatically prepare soft drinks. In the sanitary system, the city water stored in a tank disposed in the dispenser is electrolyzed using chlorine generating electrodes to generate chlorine gas, generate hypochlorous acid with bactericidal activity, and sterilize the stored water (SANYO TECHNICAL REVIEW VOL. 21 NO. 1 FEB. 1989).

Japanese patent laid-open publication 4-330986 discloses a sterilizing method, wherein salt water is supplied to an electrolytic cell having a positive electrode and a negative electrode, D.C. voltage is applied across the electrodes to generate water containing free chlorine having bactericidal activity, the water containing the free chlorine is mixed with city water, and various kinds of equipment are sterilized by the mixed water.

In the above described sanitary system, water stored in the dispenser is sterilized. Thus, the above described sanitary system cannot be directly applied to sterilization of an outlet port of a kitchen in an office or in the home, kitchen utensils such as chopping boards, etc., bath rooms, water closets, etc.

In the sterilizing method disclosed in Japanese patent laid-open publication 4-330986, it is necessary to prepare salt water, supply a salt water tank with the salt water, maintain the salt water tank, etc. Thus, the sterilizing method has a disadvantage that it requires much labor for operation and maintenance of the sterilizing apparatus for carrying out the sterilizing method.

SUMMARY OF THE INVENTION

If an electrolyzing apparatus should be available for electrolyzing flowing water containing a very small amount of chlorine ions, such as city water, industrial water, well water, etc., directly without adding salt to generate hypochlorous acid, it would be easily possible to sterilize an outlet port of a kitchen in an office or in the home, kitchen utensils such as chopping boards, bath rooms, toilet stools etc. Moreover, it would be easy to operate and maintain the sterilizing apparatus.

Thus, the object of the present invention is to provide an electrolyzing apparatus and an electrolyzing method for electrolyzing flowing water containing a very small amount of chlorine ions, such as city water, industrial water, well water, etc., stably over a long period.

In accordance with the present invention, there is provided an electrolyzing apparatus for flowing water containing chlorine ions comprising an electrolytic cell provided with at least one pair of electrodes, a passage formed between the electrodes, an inlet port and an outlet port communicating with the passage, and a power supply for applying voltage across the electrodes.

The electrolyzing apparatus in accordance with the present invention which comprises an electrolytic cell provided with at least one pair of electrodes, a passage formed between the electrodes, an inlet port and an outlet port communicating with the passage, and a power supply for applying voltage across the electrodes, can electrolyze flowing water containing a very small amount of chlorine ions, such as city water, industrial water, well water, etc., to generate a liquid having a strong bactericidal activity. By using the present electrolyzing apparatus, it is easily possible to sterilize an outlet port of a kitchen in an office or in the home, kitchen utensils such as chopping boards, bath rooms, toilet stools etc., and the sterilizing apparatus can be easily operated and maintained.

City water, industrial water, well water, etc. contain a very small amount of chlorine ions. For example, city water contains chlorine ions at 3 mg/l to 40 mg/l. When flowing water containing a very small amount of chlorine ions, such as city water, industrial water, well water, etc., is electrolyzed, chlorine gas is generated at the positive electrode. The chlorine gas dissolves in the flowing water to generate free chlorine such as hypochlorous acid, hypochlorous acid ions, etc. The flowing water containing free chlorine has bactericidal activity.

As shown in FIG. 23, flowing water containing free chlorine at a concentration substantially equal to or larger than 1 mg/l has bactericidal activity strong enough for sterilizing and preventing fouling of an outlet port of a kitchen in an office or in the home, kitchen utensils such as chopping boards, bath rooms, toilet stools etc. FIG. 23 is based on data obtained by adding $2 \times 10^6$ CFU of E. coli bacteria (Escherichia coli W3110 strain) to water containing free chlorine at a prescribed concentrations, adding sodium thiosulfate to the mixtures 20 seconds after adding the E. coli bacteria to eliminate the free chlorine, then checking the number of the surviving bacteria. It is clear from FIG. 23 that the number of surviving coli bacteria decreased as the concentration of free chlorine in the water increased, and substantially all of the coli bacteria were killed when the concentration of free chlorine was equal to or larger than 1 mg/l.

When the electrolyzing apparatus in accordance with the present invention is used, it is possible to generate flowing water containing free chlorine at a concentration substantially equal to or larger than 1mg/l by increasing the efficiency of chlorine gas generation at the positive electrode or increasing the solubility of the generated chlorine gas in the flowing water.

In accordance with a preferred embodiment of the present invention, the distance between the electrodes is larger than 0.2 mm.

When the distance between the electrodes is larger than 0.2 mm, the efficiency of chlorine generation (the ratio of the quantity of electricity effectively used for the generation of the free chlorine to the total quantity of electricity applied across the electrodes) increases, the concentration of generated free chlorine (the concentration of free chlorine generated by the chlorine gas dissolved in the flowing water) increases, and flowing water having high bactericidal activity is generated. When the distance between the electrodes is larger than 0.4 mm, the concentration of the generated free chlorine increases much more stably.

In accordance with another preferred embodiment of the present invention, at least the positive electrode of each pair of electrodes is a chlorine generating electrode.

Chlorine gas and oxygen gas are generated at the positive electrode. When at least the positive electrode of each pair of electrodes is a chlorine generating electrode, the efficiency of chlorine generation increases, the concentration of the generated free chlorine increases, and flowing water having high bactericidal activity is generated. The increase in the efficiency of chlorine generation enables downsizing of the electrodes and the electrolytic cell.

In accordance with another preferred embodiment of the present invention, all of the electrodes are chlorine generating electrodes.

Calcium ions and magnesium ions contained in the flowing water react with carbonic acid ions, etc. contained in the flowing water to generate scale on the electrode and decrease the efficiency of chlorine generation. This decrease in the efficiency of chlorine generation can be prevented by reversing the polarity of the electrodes. When all of the electrodes are chlorine generating electrodes, the efficiency of chlorine generation is maintained in spite of the reversal of the polarity of the electrodes. Thus, the efficiency of chlorine generation and the concentration of the generated free chlorine are maintained high over a long period, and flowing water having high bactericidal activity is generated stably over a long period. The increase in the efficiency of chlorine generation enables downsizing of the electrodes and the electrolytic cell.

In accordance with another preferred embodiment of the present invention, the chlorine generating electrode is constituted of solid chlorine generating catalyst When the chlorine generating electrode is constituted of a solid chlorine generating catalyst, the efficiency of chlorine generation increases, the concentration of the generated free chlorine increases, and flowing water having high bactericidal activity is generated. The increase in the efficiency of chlorine generation enables downsizing of the electrodes and the electrolytic cell.

In accordance with another preferred embodiment of the present invention, the chlorine generating electrode is constituted of a conductive material plate coated with a layer of chlorine generating catalyst. The entire surface of the conductive material plate may be coated with a layer of chlorine generating catalyst, or a part of the surface of the conductive material plate may be coated with a layer of chlorine generating catalyst.

When the chlorine generating electrode is constituted of a conductive material plate coated with a layer of chlorine generating catalyst, the efficiency of chlorine generation increases, the concentration of the generated free chlorine increases, and flowing water having high bactericidal activity is generated. The increase in the efficiency of chlorine generation enables downsizing of the electrodes and the electrolytic cell. Using a material cheaper than the chlorine generating catalyst as the conductive material decreases the production cost of the electrolyzing apparatus.

In accordance with another preferred embodiment of the present invention, the chlorine generating catalyst contains at least iridium.

When the chlorine generating catalyst contains at least iridium, the efficiency of chlorine generation increases, the concentration of the generated free chlorine increases, and flowing water having high bactericidal activity is generated. The increase in the efficiency of chlorine generation enables downsizing of the electrodes and the electrolytic cell.

In accordance with another preferred embodiment of the present invention, the chlorine generating catalyst contains at least platinum and iridium.

In accordance with another preferred embodiment of the present invention, the chlorine generating catalyst contains platinum and iridium, and the mole ratio of platinum to the sum of platinum and iridium is equal to or larger than 70%.

When the chlorine generating catalyst contains at least platinum and iridium, the desorption of the chlorine generating catalyst such as iridium oxide, caused by the application of the voltage across the electrodes is prevented by the platinum. Thus, the efficiency of chlorine generation and the concentration of the generated free chlorine are maintained high over a long period and flowing water having high bactericidal activity is generated stably over a long period. When the mole ratio of platinum to the sum of platinum and iridium is equal to or larger than 70%, preferably 80%, the service life of the electrode increases markedly.

In accordance with another preferred embodiment of the present invention, the chlorine generating catalyst contains platinum, iridium and tantalum, and the ratio of tantalum to the sum of platinum, iridium and tantalum is less than 30 weight %.

The efficiency of chlorine generation at the beginning of the electrolysis increases when the chlorine generating catalyst contains platinum, iridium and tantalum more than when it contains only platinum and iridium. However, the desorption of the chlorine generating catalyst is promoted when the chlorine generating catalyst contains platinum, iridium and tantalum more than when it contains only platinum and iridium. When the ratio of tantalum to the sum of platinum, iridium and tantalum is less than 30 weight %, the desorption of the chlorine generating catalyst is suppressed and flowing water having high bactericidal activity is generated stably over a long period.

In accordance with another preferred embodiment of the present invention, the thickness of the layer of chlorine generating catalyst is equal to or larger than 0.1 $\mu$m.

When the thickness of the layer of chlorine generating catalyst is equal to or larger than 0.1 $\mu$m, preferably 0.2 $\mu$m, the quantity of the chlorine generating catalyst is adequate and flowing water containing the generated free chlorine at a concentration equal to or larger than 1 mg/l is generated. The flowing water containing free chlorine at a concentration equal to or larger than 1 mg/l has bactericidal activity strong enough for sterilizing and preventing fouling of an outlet port of a kitchen in an office or in the home, kitchen utensils such as chopping boards, bath rooms, toilet stools, etc.

In accordance with another preferred embodiment of the present invention, the thickness of the layer of chlorine generating catalyst is equal to or larger than 0.5 $\mu$m.

When the thickness of the layer of chlorine generating catalyst is equal to or larger than 0.5 $\mu$m, formation of a layer of a non-conductor is suppressed. As the layer of chlorine generating catalyst becomes thinner because of the desorption of the chlorine generating catalyst, a greater quantity of $H_2O$ reaches the boundary surface between the conductive material plate and the layer of chlorine generating catalyst. This leads to oxidation of the surface of the conductive material plate. Thus, a layer of a non-conductor is formed between the conductive material plate and the layer of chlorine generating catalyst. Increasing the thickness of the layer of chlorine generating catalyst suppresses the formation of the layer of non-conductor between the conductive material plate and the layer of chlorine generating catalyst, which is caused by the desorption of the chlorine generating catalyst. Thus, flowing water having bactericidal activity strong enough for sterilizing and preventing fouling of an outlet port of a kitchen in an office or in the home, kitchen utensils such as chopping boards, bath rooms, toilet stools, etc., is generated stably over a long period.

In accordance with another preferred embodiment of the present invention, the conductive material has high resistance against oxidation.

When the conductive material has high resistance against oxidation, the formation of the layer of non-conductor between the conductive material plate and the layer of chlorine generating catalyst is suppressed. Thus, flowing water having high bactericidal activity is generated stably over a long period.

In accordance with another preferred embodiment of the present invention, the conductive material is titanium.

When the conductive material is titanium, which has high resistance against oxidation, the formation of the layer of non-conductor between the conductive material plate and the layer of chlorine generating catalyst is suppressed. Thus, flowing water having high bactericidal activity is generated stably over a long period. Titanium also has the advantage of high mechanical strength.

In accordance with another preferred embodiment of the present invention, spacers are disposed in a part of the space between the pair of electrodes.

When spacers are disposed in a part of the space between the pair of electrodes, the distance between the pair of electrodes is kept constant. Thus, the voltage distribution over the surface of the electrodes becomes even, and uneven desorption of the chlorine generating catalyst and uneven adhesion of scale to the electrodes are suppressed. Thus, flowing water having high bactericidal activity is generated stably over a long period. Moreover, the distance between the electrodes is kept appropriate and a drop in the efficiency of chlorine generation is prevented. Further, failure of the electrolyzing apparatus owing to short-circuiting across the electrodes is prevented.

In accordance with another preferred embodiment of the present invention, the spacers are inserted into the space between the pair of electrodes.

When the spacers are inserted into the space between the pair of electrodes, they can be easily assembled with the electrodes.

In accordance with another preferred embodiment of the present invention, the spacers are inserted into opposite side edges of the space between the pair of electrodes from the outside of the pair of electrodes.

When the spacers are inserted into opposite side edges of the space between the pair of electrodes from the outside of the pair of electrodes, an electrolytic cell wherein the space between the electrodes is narrow can be easily assembled, the volume of the spacers in the passage between the electrodes decreases, the generation of turbulence and vortices in the water flow caused by the spacers is suppressed, and the formation of stagnant locations in the flowing water is suppressed. Thus, the supply of a large amount of electric power to the stagnant locations, and the formation of scale on the electrodes by the reaction of calcium ions and magnesium ions contained in the stagnant water with carbonic acid ions, etc. contained in the stagnant water are prevented. Thus, flowing water having high bactericidal activity is generated stably over a long period.

In accordance with another preferred embodiment of the present invention, at least the surface of the spacer is made of a material with small surface energy.

When at least the surface of the spacer is made of a material with small surface energy, passage narrowing by adhesion of scale to the spacer is prevented. Thus, the formation of local regions with low flow velocity, the supply of a large amount of electric power to the local regions, and the formation of scale on the electrodes by reaction of calcium ions and magnesium ions contained in the water of the local regions with carbonic acid ions contained therein are prevented. Thus, flowing water having high bactericidal activity is generated stably over a long period.

The surface energy of water is 70 erg/cm$^2$ and the surface energy of polytetrafluoroethylene is 30 erg/cm$^2$. Because of the difference in the surface energy between the two, scale cannot easily adhere to the surface of the polytetrafluoroethylene. In general, use of a material whose surface energy differs from that of water by 40 erg/cm$^2$ or more is effective for preventing scale adhesion.

Examples of materials whose surface energies are lower than 30 erg/cm$^2$ include polytetrafluoroethylene, polypropylene hexafluoride, trifluoroethylene, trifluorochloroethylene, tetrafluorosilane, siloxanefluoride, etc.

In accordance with another preferred embodiment of the present invention, the flowing direction of the water into the inlet port of the electrolytic cell, the direction in which the passage formed between the electrodes extends, and the flowing direction of the water out of the outlet port of the electrolytic cell are aligned with each other.

When the flowing direction of the water into the inlet port of the electrolytic cell, the direction in which the passage formed between the electrodes extends, and the flowing direction of the water out of the outlet port of the electrolytic cell are aligned with each other, the generation of vortices and stagnant locations in the flowing water is suppressed. Thus, the supply of a large amount of electric power to the stagnant water, and formation of scale on the electrodes by the reaction of calcium ions and magnesium ions contained in the stagnant water with carbonic acid ions contained in the stagnant water are prevented. Thus, flowing water having high bactericidal activity is generated stably over a long period. The water in the passage flows straight to the outlet port aligned to the passage. Thus, bubbles of the hydrogen gas and the oxygen gas generated at the electrodes are easily carried away from the surface of the electrodes. Thus, a drop in the efficiency of chlorine generation caused by residence of the bubbles is prevented.

In accordance with another preferred embodiment of the present invention, the inlet port side of the passage formed between the electrodes of the electrolytic cell is disposed below the outlet port side of the passage.

When the inlet port side end of the passage formed between the electrodes of the electrolytic cell is disposed below the outlet port side of the passage, bubbles of the hydrogen gas and the oxygen gas generated at the electrodes are rapidly discharged from the passage because of the buoyancy and the water flow. Thus, a drop in the efficiency of chlorine generation caused by residence of the bubbles is prevented.

In accordance with another preferred embodiment of the present invention, the electrodes of the electrolytic cell are coated with insulating material at parts near the inlet port side of the passage and near the outlet port side of the passage.

When the electrodes of the electrolytic cell are coated with insulating material at parts near the inlet port side of the passage and near the outlet port side of the passage, the concentration of the electric current at the inlet port side and the outlet port side of the passage can be prevented. As a result, the formation of scale on the electrodes at the inlet port side and the outlet port side of the passage by the reaction of calcium ions and magnesium ions contained in the flowing water with carbonic acid ions contained in the flowing water is prevented. Thus, flowing water having high bactericidal activity is generated stably over a long period.

In accordance with another preferred embodiment of the present invention, the sectional area of the outlet port side of the passage between the electrodes of the electrolytic cell is 1.01 or more times as large as that of the inlet port side of the passage.

When the sectional area of the outlet port side of the passage between the electrodes of the electrolytic cell is 1.01 or more times as large as that of the inlet port side of the passage, the drop in the flow velocity of the flowing water caused by the increase in the volume of the flowing water owing to the generation of bubbles of hydrogen gas and oxygen gas at the electrodes is prevented. Thus, the supply of a large amount of electric power to flowing water with a low flow velocity, and the formation of scale on the electrodes by the reaction of calcium ions and magnesium ions contained in slow flowing water with carbonic acid ions are prevented. Thus, flowing water having high bactericidal activity is generated stably over a long period.

In accordance with another preferred embodiment of the present invention, the power supply is a D.C. power supply whose output polarity is reversible.

When the power supply is a D.C. power supply whose output polarity is reversible, the adhesion of scale to the electrodes can be suppressed by reversing the polarity of the electrodes. Thus, flowing water having high bactericidal activity is generated stably over a long period.

In accordance with another preferred embodiment of the present invention, the electrolytic cell is a non-barrier type electrolytic cell.

When the electrolytic cell is a non-barrier type electrolytic cell, the electrolysis voltage can be decreased by narrowing the distance between the electrodes and the structure of the electrolytic cell can be made simple.

In accordance with another aspect of the present invention, there is provided a method for electrolyzing flowing water containing chlorine ions, wherein direct current with a current density of less than 1100 A/m$^2$ is applied across the electrodes of any one of the above described electrolyzing apparatuses.

When direct current with a current density of less than 1100 A/m$^2$ is applied across the electrodes of any one of the above described electrolyzing apparatuses, the desorption of the chlorine generating catalyst from the electrode is suppressed. Thus, flowing water having high bactericidal activity is generated stably over a long period.

In accordance with another aspect of the present invention, there is provided a method for electrolyzing flowing water containing chlorine ions, wherein direct current with a current density of equal to or larger than 300 A/m$^2$ is applied across the electrodes of any one of the above described electrolyzing apparatuses.

When direct current with a current density of equal to or larger than 300 A/m$^2$ is applied across the electrodes of any one of the above described electrolyzing apparatuses, flowing water containing free chlorine at a concentration equal to or larger than 1 mg/l can be generated. The flowing water containing free chlorine at a concentration equal to or larger than 1 mg/l has bactericidal activity strong enough for sterilizing and preventing fouling of an outlet port of a kitchen in an office or in the home, kitchen utensils such as chopping boards, bath rooms, toilet stools, etc.

In accordance with another aspect of the present invention, there is provided a method for electrolyzing flowing water containing chlorine ions, wherein direct current with a current density of 400 A/m$^2$ to 600 A/m$^2$ is applied across the electrodes of any one of the above described electrolyzing apparatuses.

When the direct current with a current density of 400 A/m$^2$ to 600 A/m$^2$ is applied across the electrodes of any one of the above described electrolyzing apparatuses, the efficiency of chlorine generation increases.

In accordance with another aspect of the present invention, there is provided a method For electrolyzing flowing water containing chlorine ions, wherein any one of the above described electrolyzing apparatuses is used and the flow of the water is maintained until a prescribed length of time passes after the stoppage of the electrolysis.

When any one of the above described electrolyzing apparatuses is used and the flow of the water is maintained until a prescribed length of time passes after the stoppage of the electrolysis, the electrolysis of the water resident in the electrolytic cell is prevented. Thus, the adhesion of scale to the negative electrode is prevented and flowing water having high bactericidal activity is generated stably over a long period.

In accordance with another aspect of the present invention, there is provided a method for electrolyzing flowing water containing chlorine ions, wherein any one of the above described electrolyzing apparatuses is used and the polarity of the electrodes is reversed during the electrolysis.

When any one of the above described electrolyzing apparatuses is used and the polarity of the electrodes is reversed during the electrolysis, the adhesion of scale to the negative electrode is prevented and flowing water having high bactericidal activity is generated stably over a long period.

In accordance with a preferred embodiment of the present invention, the polarity of the electrodes is reversed less than 12 times per hour of total time of the electrolysis.

When the polarity of the electrodes is reversed less than 12 times per hour of total time of the electrolysis, the desorption of the chlorine generating catalyst out of the electrode is suppressed. Thus, flowing water having high bactericidal activity is generated stably over a long period.

In accordance with another preferred embodiment of the present invention, the polarity of the electrodes is reversed 1 time per 10 or more repetitions of the electrolysis.

When the polarity of the electrodes is reversed 1 time per 10 or more repetitions of the electrolysis, the desorption of the chlorine generating catalyst out of the electrode is suppressed. Thus, flowing water having high bactericidal activity is generated stably over a long period.

In accordance with another aspect of the present invention, there is provided a method for electrolyzing flowing water containing chlorine ions, wherein any one of the above described electrolyzing apparatuses is used and the water passed into the electrolytic cell through the inlet port is electrolyzed after being warmed to a temperature higher than normal room temperature and lower than 50° C.

When any one of the above described electrolyzing apparatuses is used and the water passed into the electrolytic cell through the inlet port is electrolyzed after being warmed to a temperature higher than normal room temperature and lower than 50° C., the solubility of the chlorine gas in the flowing water increases and the efficiency of chlorine generation increases. Thus, flowing water having high bactericidal activity is generated. The efficiency of chlorine gas generation at the positive electrode does not change in the temperature range between normal room temperature and 50° C.

In accordance with a preferred embodiment of the present invention, city water is electrolyzed.

When any one of the above described electrolyzing apparatuses is used and flowing city water is electrolyzed, the chlorine ions contained in the flowing city water can be efficiently changed into chlorine gas because city water contains only a small amount of organic matter, which adsorbs the chlorine ions or reacts with the chlorine ions. Thus, flowing water having high bactericidal activity is generated.

In accordance with another preferred embodiment of the present invention, industrial water is electrolyzed.

In accordance with another preferred embodiment of the present invention, well water is electrolyzed.

When any one of the above described electrolyzing apparatuses is used and flowing industrial water or flowing well water is electrolyzed, flowing water containing free chlorine and amine chloride and having high bactericidal activity is generated.

BRIEF DESCRIPTION OF DRAWINGS

FIG. 12 is a graph showing how the concentration of the generated free chlorine varies with current density.

THE BEST MODE FOR CARRYING OUT THE INVENTION

Preferred embodiments of the present invention will be described.

Figure 1:
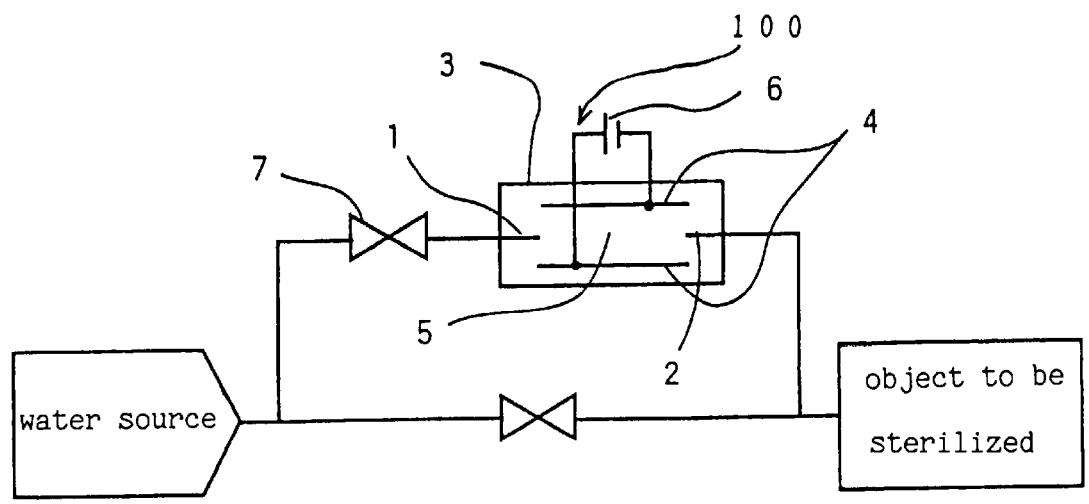
FIG. 1 is a schematic view of the layout of an electrolyzing apparatus which is an embodiment of the present invention.

FIG. 1 is a schematic view of the layout of an electrolyzing apparatus which is a preferred embodiment of the present invention. An electrolyzing apparatus 100 which is a preferred embodiment of the present invention has a non-barrier type electrolytic cell 3 having an inlet port 1 and an outlet port 2, electrode plates 4, 4 disposed in the electrolytic cell 3 at a prescribed spacing to define a passage 5 between them, and a D.C. power supply 6 for applying D.C. voltage across the electrode plates 4, 4.

Flowing water containing chlorine ions supplied from a water supply flows through a flow control valve 7, into the electrolytic cell 3 through the inlet port 1, and through the passage 5 formed between the electrode plates 4, 4. The flowing water containing chlorine ions is electrolyzed when it flows through the passage 5 to become a liquid with strong bactericidal activity containing free chlorine. The liquid with strong bactericidal activity generated by the electrolysis of the flowing water containing chlorine ions flows out of the electrolytic cell 3 through the outlet port 2, and is supplied to an object to sterilize it.

The electrolysis reaction of the flowing water containing chlorine ions will be described.

When the flowing water containing chlorine ions flows through the passage 5 between the electrode plates 4, 4, a hydrogen generating reaction expressed by the chemical formula I occurs at the negative electrode, while a chlorine generating reaction expressed by the chemical formula II and an oxygen generating reaction expressed by the chemical formula III occur at the positive electrode. Chlorine gas ($Cl_2$) generated by the chlorine generating reaction dissolves in the water to generate free chlorine with strong bactericidal activity such as hypochlorous acid (HClO), hypochlorous acid ions ($ClO^-$), etc.

$$2H_2O + 2e^- \rightarrow H_2 + 2OH^- \qquad \text{I}$$

$$2Cl^- \rightarrow Cl_2 + 2e^- \qquad \text{II}$$

$$H_2O \rightarrow 1/2O_2 + 2H^+ + 2e^- \qquad \text{III}$$

When the electrolyzing apparatus is used over a long period, the generation of the hypochlorous acid and the hypochlorous acid ions is eventually arrested by desorption of the material of the electrode provided for promoting the chlorine generating reaction in the flowing water, conversion of the electrode into a non-conductor by oxidation, and conversion of the electrode into a non-conductor by adhesion of insulating scale to the surface of the electrode. The conversion of the electrode into a non-conductor by the adhesion of insulating scale occurs through a process of adherence of insulating scale to restricted portions of the electrode surface, increase in the electric current around the restricted portions, growth of scale owing to the increase in electric current, and gradual conversion of the whole electrode into a non-conductor by the scale growth. Thus, the generation of the chlorine gas is arrested, and the generation of hypochlorous acid and hypochlorous acid ions is also arrested.

In the electrolysis of flowing water using the above described electrolyzing apparatus, the stronger the chlorine gas generating reaction is relative to the oxygen gas generating reaction, the higher is the efficiency of free chlorine generation.

It is preferable to use a chlorine generating electrode for the positive electrode so as to make the chlorine gas generating reaction be stronger than the oxygen gas generating reaction. By a "chlorine generating electrode" is meant an electrode which can cause the chlorine generating reaction. Examples of chlorine generating electrodes include ferrous electrodes such as ferritic electrodes, palladium electrodes, ruthenium electrodes, iridium electrodes, platinum electrodes, ruthenium-stannum electrodes, palladium-platinum electrodes, iridium-platinum electrodes, ruthenium-platinum electrodes, iridium-platinum-tantalum electrodes, etc.

Figure 2:
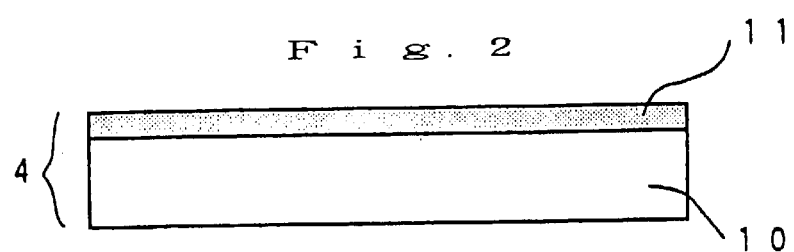
FIG. 2 is a sectional view of a chlorine generating electrode of an electrolyzing apparatus which is an embodiment of the present invention.

The chlorine generating electrode may be a plate of solid chlorine generating catalyst (a catalyst which can cause chlorine generating reaction) or, as shown in FIG. 2, a plate 10 of conductive material coated with a layer 11 of chlorine generating catalyst.

Examples of the chlorine generating catalysts include compounds of metals, Oxides, etc., which contain iridium, platinum, palladium, ruthenium, rhodium, osmium, iron, cobalt, nickel, etc.

The chlorine generating catalyst preferably does not easily desorb in water. If the chlorine generating catalyst desorbs in water, the chlorine generating reaction at the chlorine generating electrode is eventually arrested.

Any kind of good conductor may be used for the conductive material. Examples of conductive materials include titanium, ferrite, silver, platinum, gold, and copper.

Figure 3:
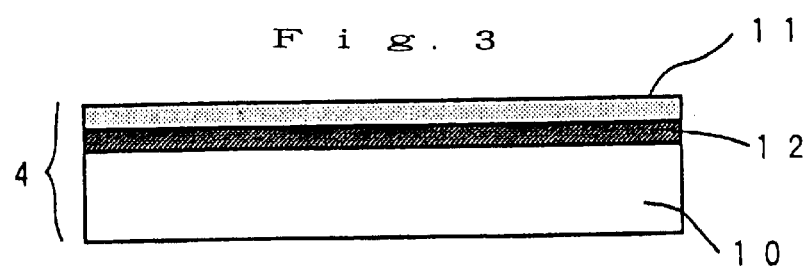
FIG. 3 is a sectional view of a chlorine generating electrode for explaining the mechanism of the deterioration of the chlorine generating electrode.

The conductive material preferably has large resistance against oxidation. By "resistance against oxidation" is meant ability to withstand oxidation by oxidants in the flowing water or avoid generation of a non-conductor layer by oxidation. As shown in FIG. 3, when the conductive material has small resistance against oxidation, an insulating material layer 12 constituted of the oxide of the conductive material forms between the plate 10 of the conductive material and the layer 11 of chlorine generating catalyst. When the thickness of the insulating material layer 12 comes to exceed a certain threshold value, the chlorine generating electrode becomes a non-conductor, the electrical continuity between the electrodes is arrested, and the generation of chlorine gas at the chlorine generating electrode is arrested. Titanium is a conductive material which has large resistance against oxidation. Titanium is not oxidized in high pressurized hot water up to the temperature of 400° C.

The electrolysis of flowing water is preferably conducted in a manner in which the insulating scale does not easily adhere to the surface of the electrode. When the insulating scale adheres to the surface of the electrode, the electrode becomes a non-conductor, the electrical continuity between the electrodes is blocked, and the generation of chlorine gas at the chlorine generating electrode is arrested.

It is thought that the adhesion of scale to the electrode occurs through a process wherein positive ions such as calcium ions, magnesium ions, etc., in the lowing water are drawn to the negative electrode and react with carbonic acid ions in the flowing water to generate calcium carbonate, magnesium carbonate, etc., and these product materials adhere to the surface of the electrode. Inventors of the present invention carried out an analysis using the X-ray diffraction method and detected crystalline calcium carbonate from an electrode to which scale adhered.

Figure 4:
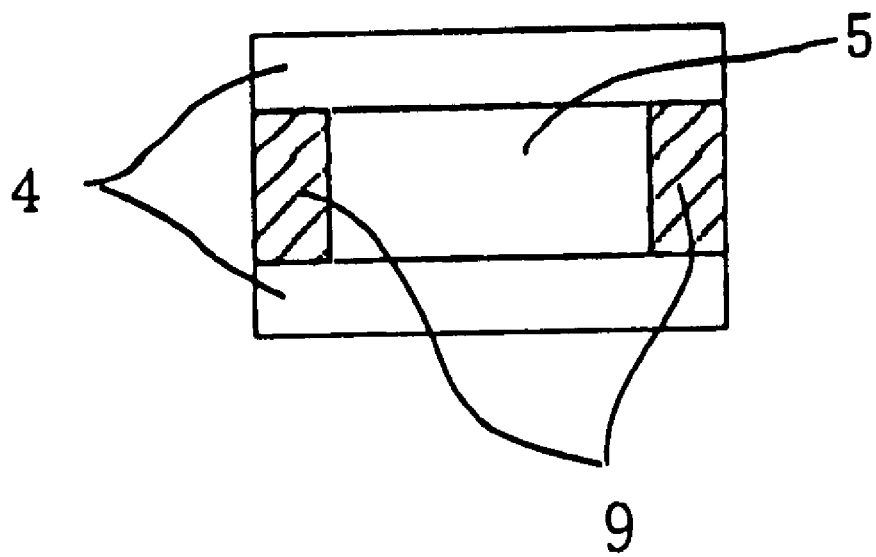
FIG. 4 is a sectional view of an electrolytic cell of an electrolyzing apparatus which is an embodiment of the present invention.
Figure 5:
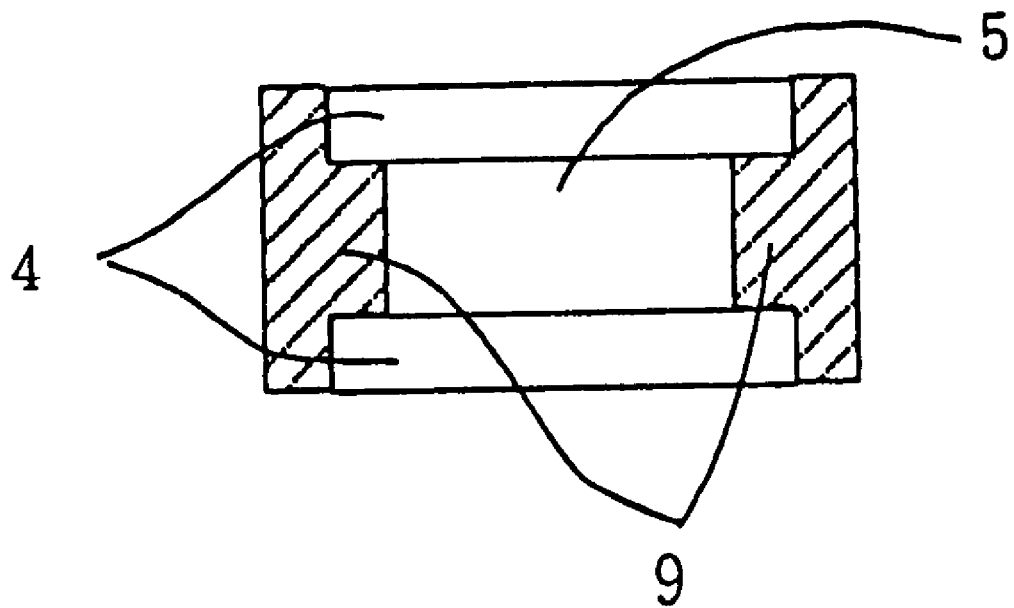
FIG. 5 is a sectional view of an electrolytic cell of an electrolyzing apparatus which is another embodiment of the present invention.

In the electrolytic cell 3 shown in FIG. 1, the electrode plates 4, 4 are disposed at a prescribed spacing. Spacers are preferably disposed between the electrode plates 4, 4 to dispose the electrode plates 4, 4 at a prescribed distance from each other. As shown in FIG. 4, a pair of spacers 9 may be inserted into the space between the electrode plates 4, 4 parallel to the direction in which the passage 5 between the electrode plates 4, 4 extends, or as shown in FIG. 5, a pair of spacers 9 may be inserted into the side edge portions of the space between the electrode plates 4, 4 parallel to the direction in which the passage 5 between the electrode plates 4, 4 extends from the outside of the electrode plates 4, 4. If the surface area of the electrode plates 4, 4 is large, 3 or more spacers 9 are preferably disposed between them so as to keep the distance between the electrode plates 4, 4 constant.

The spacers 9 are made of an insulating material so as to prevent short-circuiting between the electrodes. At least the surfaces of the spacers 9 are preferably made of a material with small surface energy so as to prevent adhesion of scale. A "material with small surface energy" means a material whose surface energy is less than 30 erg/$cm^2$. The material with small surface energy can, for example, be a resin containing tetrafluoro radical. Polyterafluoroethylene is an especially suitable material.

The electrolytic cell 3 may be configured in any manner so long as it has the basic layout shown in FIG. 1. The electrolytic cell 3 is preferably of a non-barrier type. If the electrolytic cell 3 is of the non-barrier type, the distance between the electrodes can be made narrow to decrease the electrolytic voltage and the structure of the electrolytic cell 3 can be made simple.

Figure 6A:
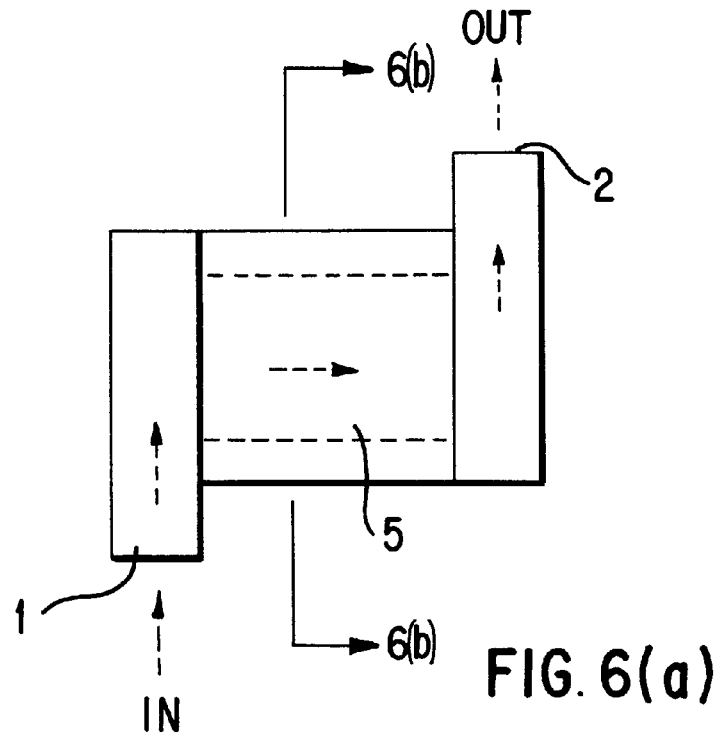
FIG. 6(a) is a plan view of an electrolytic cell of an electrolyzing apparatus which is yet another embodiment of the present invention.
Figure 6B:
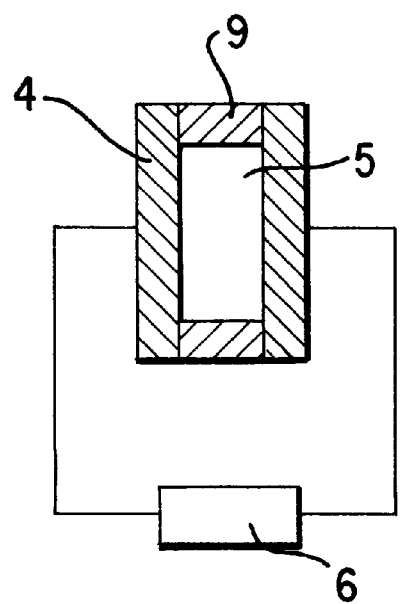
FIG. 6(b) is a view along line b—b in FIG. 6(a).
Figure 7A:
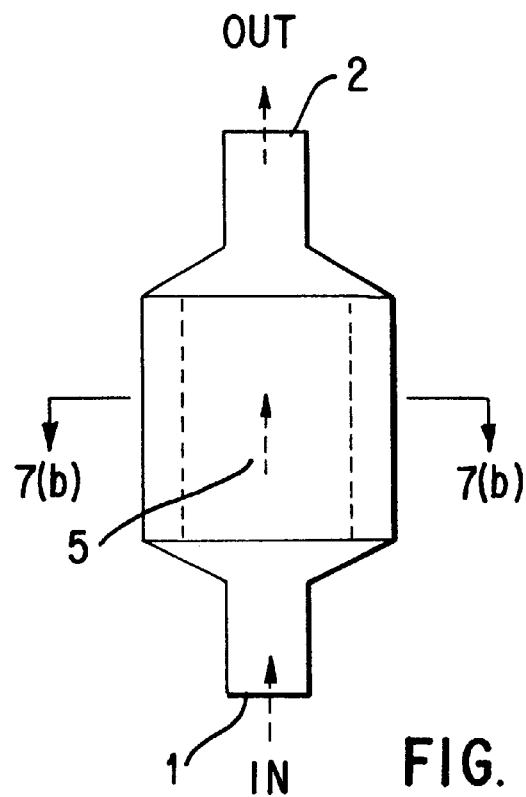
FIG. 7(a) is a plan view of another electrolytic cell of an electrolyzing apparatus which is an embodiment of the present invention.
Figure 7B:
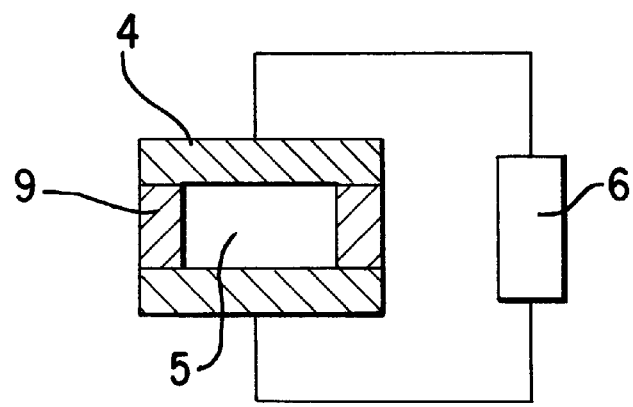
FIG. 7(b) is a view along line b—b in FIG. 7(a).

Examples of the structures of the electrolytic cell 3 are shown in FIGS. 6 and 7.

In the example shown in FIG. 6, the direction of the flow of the liquid flowing into the inlet port 1 and the direction of the flow of the liquid flowing out the outlet port 2 cross at right angles with the direction in which the passage 5 formed between the electrode plates 4, 4 extends. The electrode plates 4, 4 are connected to a polarity-reversible D.C. power supply 6.

In the example shown in FIG. 7, the direction of the flow of the liquid flowing into the inlet port 1 and the direction of the flow of the liquid flowing out the outlet port 2 are in line with the direction in which the passage 5 formed between the electrode plates 4, 4 extends. The electrode plates 4, 4 are connected to a polarity reversible D.C. power supply 6.

If the flowing water containing chlorine ions supplied to the electrolyzing apparatus 100 shown in FIG. 1 is city water, substantially all of the chlorine gas generated by the electrolysis of the city water dissolves in the water to generate free chlorine such as hypochlorous acid, hypochlorous acid ions, etc. Thus, a liquid containing free chlorine and having strong bactericidal activity flows out the electrolyzing apparatus 100.

If the flowing water containing chlorine ions supplied to the electrolyzing apparatus 100 shown in FIG. 1 is industrial water or well water, a part of the chlorine gas generated by the electrolysis of industrial water or well water may react with an amine compound in industrial water or well water to generate one or more amine chlorides such as chloroamine, dichloroamine, trichloroamine, etc,. These amine chlorides also have bactericidal activity. Thus, a liquid containing free chlorine and amine chlorides and having strong bactericidal activity flows out the electrolyzing apparatus 100.

The liquid with strong bactericidal activity flowing out the electrolyzing apparatus 100 is supplied onto the objects to be sterilized, such as devices used in water environments, to sterilize them. Examples of the devices used in water environments include sinks, system kitchen equipment, sink and the system kitchen components such as traps and kitchen counters, kitchen utensils such as chopping boards and dishes, wash stands, wash basins, wash stand and wash basin components such as sinks, traps and water faucet hardware, personal care articles such toothbrush boxes, shelves for small toilet articles, lavatory apparatuses such as toilet stools, toilet seats, bidets, toilet covers and urinals, bath rooms, unit baths, saunas, bath room apparatuses located in and out of the bath room such as bath tubs, bathing areas, hot-water supplying equipment, water faucets, showers, soap holders, bath tub covers and mirrors, and laundry equipment such as washing machines, washing machine pans and laundry sinks.

Optimum specifications and running conditions of the electrolyzing apparatus 100 were determined through tests.

I. Test 1

The effects of the distance between the electrode plates and the current density on the concentration of the generated free chlorine and the efficiency of chlorine generation were investigated.

A. Test Conditions

Electrolyzing tests were carried out on city water at various distances between the electrodes and various current densities to investigate the change in the concentration of the generated free chlorine and the change in the efficiency of chlorine generation.

Figure 8:
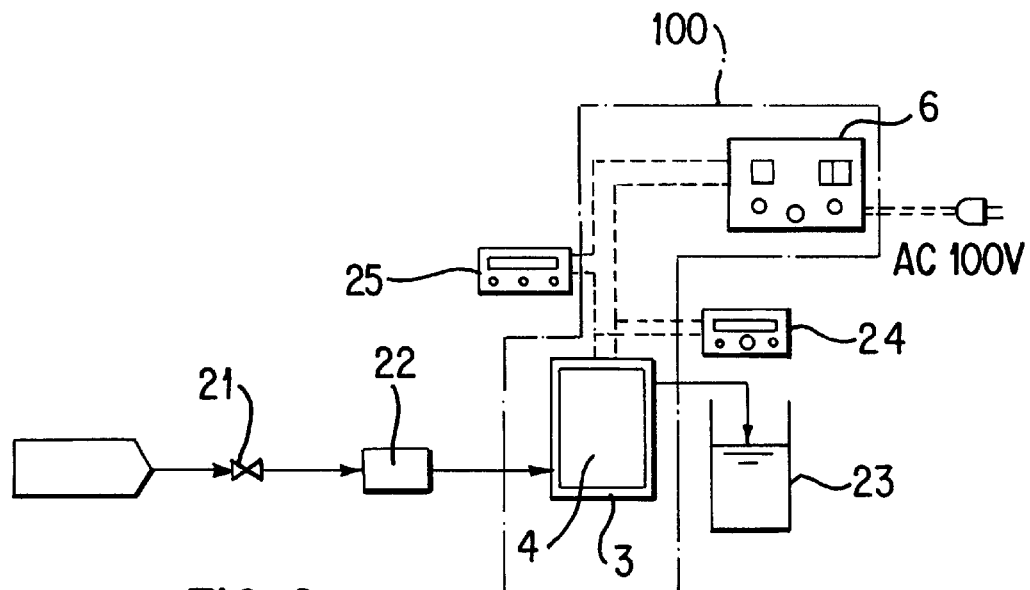
FIG. 8 is a view of the layout of a measurement apparatus for carrying out an electrolyzing test on flowing city water.

As shown in FIG. 8, city water was fed to an electrolyzing apparatus 100 through a flow control valve 21 and a flow meter 22. The flow rate was controlled by the flow control valve 21 and measured by the flow meter 22. A plurality of electrode plates 4 were disposed at prescribed spacing in an electrolytic cell 3 of the electrolyzing apparatus 100. The city water flowing through the passages formed between adjacent electrode plates 4 was discharged from the electrolytic cell 3 and received in a beaker 23. The D.C. power supply 6 of the electrolyzing apparatus 100 was provided with a rectifier circuit and connected to a domestic AC 100 volt power supply. The electrode plates 4 disposed in the electrolytic cell 3 were connected to the D.C. power supply 6. Voltage applied across the electrode plates 4 was measured by a voltmeter 24. Electric current flowing across the electrode plates 4 was measured by an ammeter 25.

Figure 9:
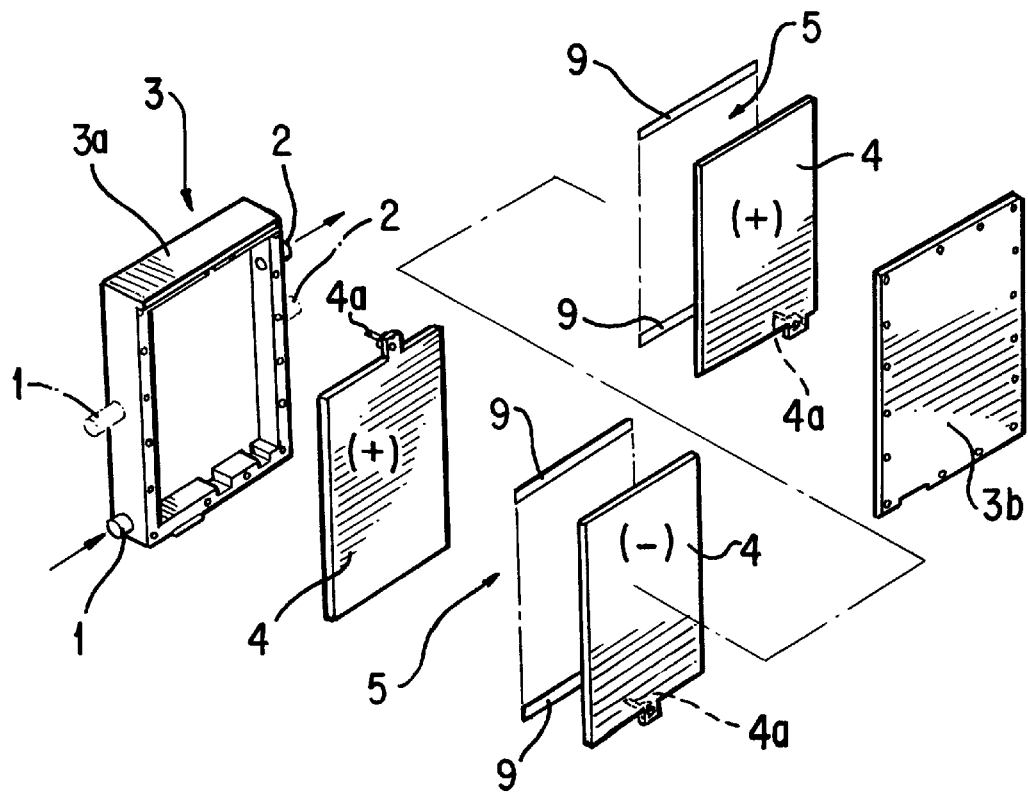
FIG. 9 is an exploded perspective view of the electrolytic cell in FIG. 8.

As shown in FIG. 9, the electrolytic cell 3 had a box-like member 3a of rectangular sectional shape and closed at one end and a cover member 3b for closing the open end of the box-like member 3a to be watertight. The direction of the flow of the liquid flowing into the inlet port 1, disposed at the lower part of the electrolytic cell 3, and the direction of the flow of the liquid flowing out the outlet port 2, disposed at the upper part of the electrolytic cell 3, are at right angles to the direction in which the passage 5 formed between the electrode plates 4, 4 extends.

The electrode plates 4 were rectangular and measured 70 mm(L)×50 mm(W)×0.5 mm(T).

The test was conducted with the distance between adjacent electrodes set at 0.19 mm, 0.43 mm and 0.86 mm.

As shown in FIG. 9, when the distance between the electrodes was set at 0.19 mm and 0.43 mm, three electrode plates 4 were disposed in the electrolytic cell 3. The connecting terminal 4a of each electrode plate 4 was led out of the electrolytic cell 3. The electrode plates 4 disposed on opposite sides were used as positive electrodes. Titanium electrode plates coated with iridium were used for the positive electrodes. The electrode plate 4 disposed at the center was used as a negative electrode. The negative electrode was formed of platinum. Spacers 9 having a thickness equal to the distance between adjacent electrode plates 4 were inserted into the spaces between the electrode plates 4 to keep the desired electrode spacing. The substantial area of the electrodes excluding the area in contact with the spacers 9 was set at 0.60 $dm^2$/electrode.

When the distance between the electrodes was set at 0.86 mm, two electrode plates 4 were disposed in the electrolytic cell 3. One of the electrode plates 4 was used as a positive electrode. A titanium electrode plate coated with iridium was used for the positive electrode. The other electrode plate 4 was used as a negative electrode. The negative electrode was formed of platinum. Spacers 9 having a thickness equal to the distance between the electrode plates 4 were inserted into the space between the electrode plates 4 to keep the desired electrode spacing. The substantial area of the electrodes excluding the area in contact with the spacers 9 was set at 0.60 $dm^2$/electrode.

City water was fed into the electrolytic cell 3 through the inlet port 1. When the distance between the electrodes was set at 0.19 mm or 0.43 mm, the city water flowed through two passages 5 formed between adjacent pairs of the three electrode plates 4 at a flow rate of 0.24 $dm^3$/minute per passage. When the distance between the electrodes was set at 0.86 mm, the city water flowed through a single passage 5 formed between the two electrode plates 4 at a flow rate of 0.26 dm$^3$/minute. Then, the city water was discharged out of the electrolytic cell 3 through the outlet port 2.

The voltage applied across the electrodes was varied to vary the current density across the electrodes stepwise in the range of 167 A/m$^2$ to 1333 A/m$^2$. In each combination of the distance between the electrodes and the current density, cycles consisting of two minutes of electrolysis of flowing water and one minute of stoppage of the flow of the water and electrolysis were repeated 10 times. In each cycle, 0.01 dm$^3$ of the city water discharged out of the electrolytic cell 3 was sampled one minute after the start of the electrolysis of the flowing water. The concentration of the free chlorine in the sampled water was measured by the DPD method. The mean value of 10 measurements was calculated. The concentration of the free chlorine in the city water before the electrolysis was measured by the DPD method and subtracted from the mean value of the concentration of free chlorine in the discharged water. Thus, the concentration of free chlorine generated by the electrolysis, i.e. the concentration of the generated free chlorine, was obtained.

The test conditions are shown in Table 1.

B. Test Results

The mean value of the concentration of free chlorine in the discharged water and the concentration of the generated free chlorine for each combination of distance between the electrodes and current density are shown in Table 1.

The efficiencies of chlorine generation (current efficiency) $\eta$ were obtained according to formula IV and are shown in Table 1.

$$\eta=(Cfcl \times Q \times 96500)/(35.5 \times I \times 10^3 \times 60) \ (\%) \quad \text{IV}$$

Cfcl=concentration of the generated free chlorine (mg/l)

Q=flow rate (l/min)

I=electric current (A)

Figure 10:
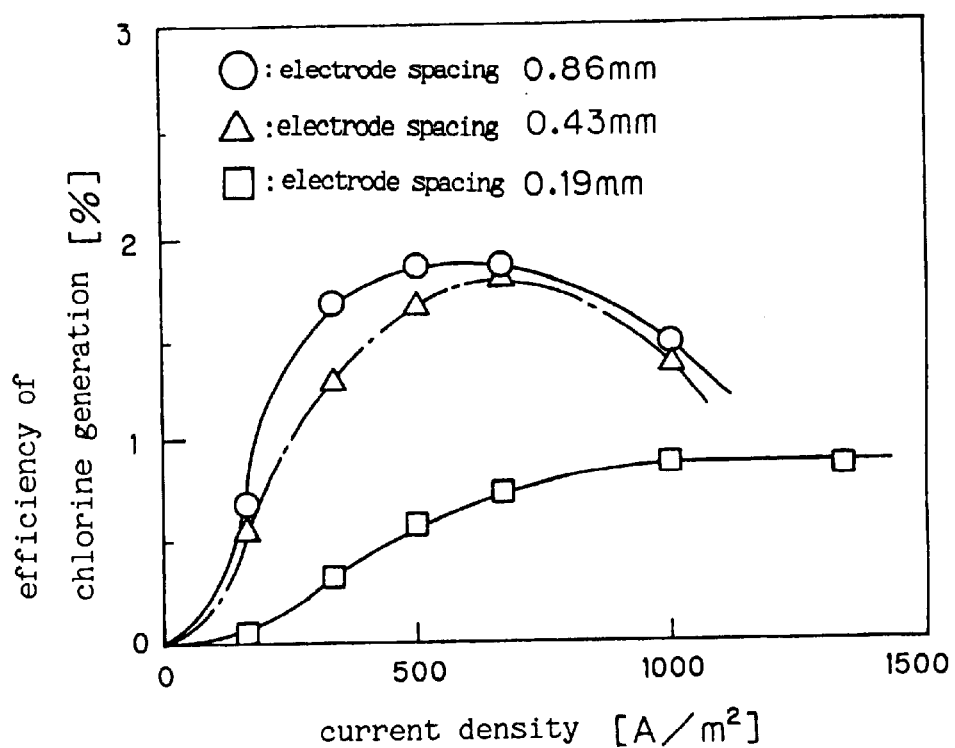
FIG. 10 is a view showing how the efficiency of chlorine generation varies with current density.

The variation in the efficiency of chlorine generation $\eta$ with current density at different distances between the electrodes is shown in FIG. 10.

From FIG. 10, it is clear that the efficiency of chlorine generation when the distance between the electrodes was 0.43 mm and the efficiency of chlorine generation when the distance between the electrodes was 0.86 mm became maximum in the current density range from 400 A/m$^2$ to 600 A/m$^2$.

Figure 11:
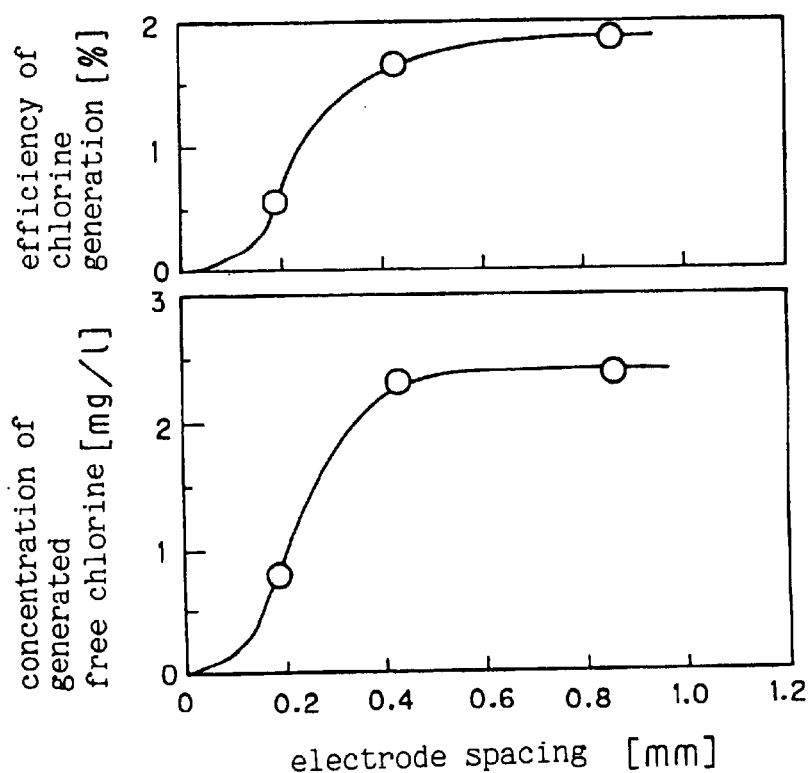
FIG. 11 is a graph showing how the concentration of the generated free chlorine and the efficiency of chlorine generation vary with distance between the electrodes.
Figure 11A:
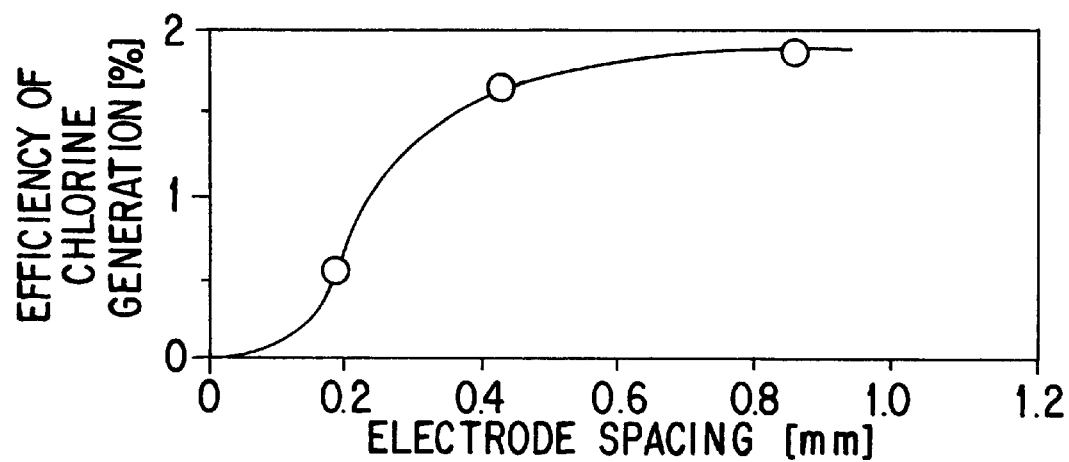
Figure 11B:
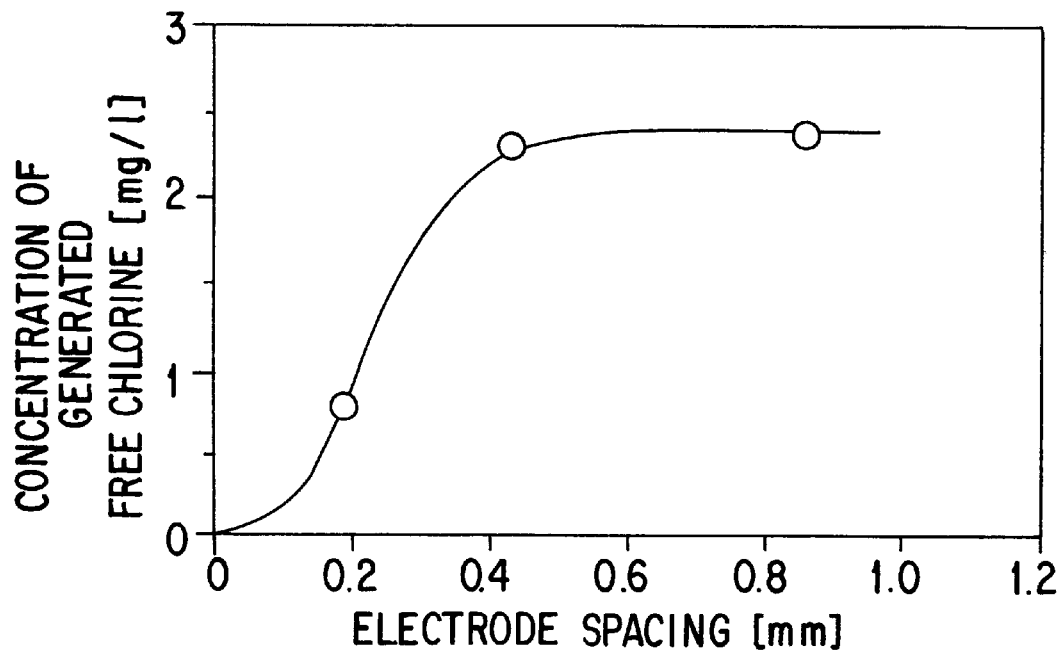

The variation in the concentration of the generated free chlorine with distance between the electrodes, and the variation in the efficiency of chlorine generation with distance between the electrodes, at a current density of 500 A m$^2$, are shown in FIG. 11.

From FIG. 11, it is clear that when the distance between the electrodes was larger than 0.2 mm, the concentration of the generated free chlorine became substantially equal to or larger than 1 mg/l. A concentration of the generated free chlorine substantially equal to or larger than 1 mg/l is large enough for sterilizing or preventing the fouling of an outlet port of a kitchen, chopping boards, toilet stools, bath tubs, etc.

From FIG. 11, it is clear that when the distance between the electrodes was equal to or larger than 0.4 mm, the concentration of the generated free chlorine and the efficiency of chlorine generation became constantly high.

The variation in the concentration of the generated free chlorine with current density when the distance between the electrodes was set at 0.43 mm and 0.86 mm is shown in FIG. 12.

From FIG. 12, it is clear that when the current density was equal to or larger than 300 A/m$^2$, the concentration of the generated free chlorine became substantially equal to or larger than 1 mg/l. As mentioned above, a concentration of the generated free chlorine substantially equal to or larger than 1 mg/l is large enough for sterilizing or preventing the fouling of an outlet port of a kitchen, chopping boards, toilet stools, bath tubs, etc.

Test 2

The effect of polarity reversal of the electrodes and the timing of stoppage of the electrolysis on deterioration of the concentration of the generated free chlorine with age and deterioration of the efficiency of chlorine generation with age were investigated.

A. Test Conditions

Electrolyzing tests were carried out on flowing city water under condition of as a rule no reversal of electrode polarity and under condition of electrode polarity reversal. The deterioration of the concentration of the generated free chlorine with age and the deterioration of the efficiency of chlorine generation with age were investigated.

The measurement apparatus shown in FIGS. 8 and 9, which is the same as that used in Test 1, was used. However, a switching power supply of 12 V was used as the D.C. power supply 6.

The electrode plates 4 were rectangular and measured 70 mm(L)×50 mm(W)×0.5 mm(T).

Three electrode plates 4 were disposed in the electrolytic cell 3. The distance between adjacent electrodes was set at 0.43 mm. Spacers 9 having a thickness equal to the distance between the electrode plates 4 were inserted into the spaces between the electrode plates 4 to keep the desired electrode spacing. The substantial area of the electrodes excluding the area in contact with the spacers 9 was set at 0.60 dm$^2$/electrode.

When the polarity of the electrodes was not as a rule reversed, titanium electrode plates coated with iridium were used for the electrode plates 4 disposed on opposite sides, and a platinum electrode plate was used for the electrode plate 4 disposed at the center. When the polarity of the electrodes was reversed, titanium electrode plates coated with iridium were used for all of the electrode plates 4.

City water was fed into the electrolytic cell 3 through the inlet port 1 and passed into two passages 5 formed between the three electrode plates 4 at a flow rate of 0.25 dm$^3$/minute per passage. Then, the city water was discharged out of the electrolytic cell 3 through the outlet port 2.

Cycles consisting of two minutes of electrolysis of flowing water, and one minute of no electrolysis as well as no flow of the water were repeated.

When the polarity of the electrodes was not as a rule reversed, the electrode plates 4 disposed on opposite sides were used as positive electrodes, and the electrode plate 4 disposed at the center was used as a negative electrode. When the total time of the electrolysis reached 25.3 hours, the polarity of the electrodes was reversed to make the electrode plates 4 disposed on opposite sides the negative electrodes and make the electrode plate 4 disposed at the center the positive electrode. When the total time of electrolysis reached 37.3 hours, the polarity of the electrodes was reversed to make the electrode plates 4 disposed on opposite sides the positive electrodes and make the electrode plate 4 disposed at the center the negative electrode. The D.C. power supply 6 was turned on simultaneously with the start of the flow of the water to apply 12 V voltage across the electrode plates 4. The D.C. power supply 6 was turned off simultaneously with the stoppage of the flow of the water to stop the application of voltage across the electrode plates 4.

When the polarity of the electrodes was reversed, it was reversed every electrolysis. The reversal of the polarity was made between two polarity states. In the first state, the electrode plates 4 disposed on opposite sides were used as the positive electrodes and the electrode plate 4 disposed at the center was used as the negative electrode. In the second state, the electrode plates 4 disposed on opposite sides were used as the negative electrodes and the electrode plate 4 disposed at the center was used as the positive electrode. The D.C. power supply 6 was turned on simultaneously with the start of the flow of the water to apply 12 V across the electrode plates 4. Before the total time of the electrolysis had reached 4 hours, the D.C. power supply 6 was turned off simultaneously with the stoppage of the flow of the water to stop the application of voltage across the electrode plates 4. After the total time of the electrolysis had reached 4 hours, the D.C. power supply 6 was turned off 10 seconds before the stoppage of the flow of the water to stop the application of voltage across the electrode plates 4.

At appropriate time intervals, 0.01 dm$^3$ of the city water discharged out of the electrolytic cell 3 was sampled one minute after the start of the electrolysis of the flowing water. The concentration of the free chlorine in the sampled water was measured by the DPD method. The concentration of the free chlorine in the city water before the electrolysis was measured by the DPD method and subtracted from the concentration of free chlorine in the discharged water. Thus, the concentration of the generated free chlorine was obtained. The efficiency of chlorine generation η was obtained according to the formula IV.

B. Test Results

Figure 13:
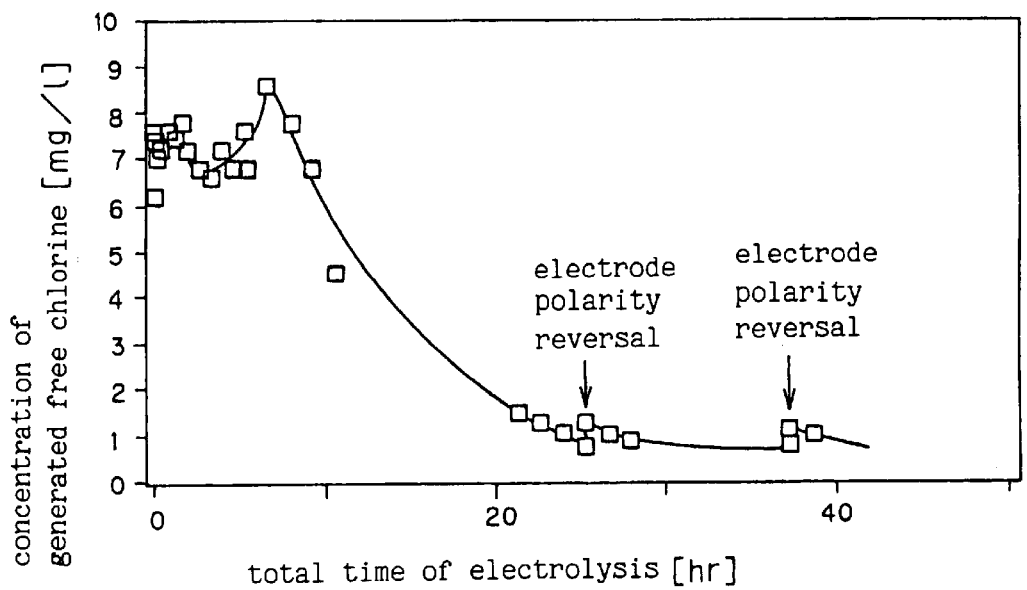
FIG. 13 is a graph showing the deterioration of the concentration of the generated free chlorine with age when the polarity of the electrodes is not as a rule reversed.
Figure 14:
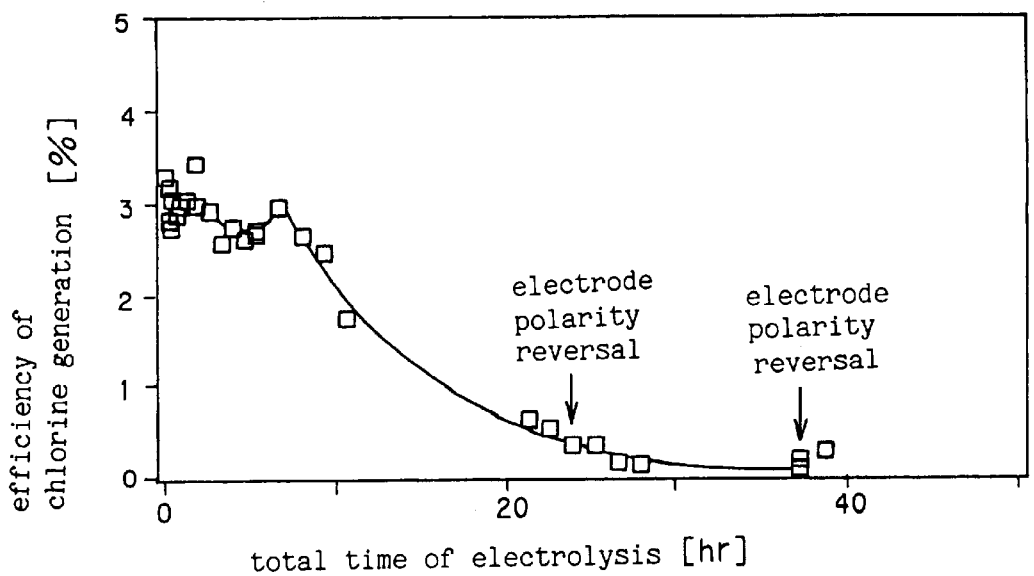
FIG. 14 is a graph showing the deterioration of the efficiency of chlorine generation with age when the polarity of the electrodes is not as a rule reversed.

The deterioration of the concentration of the generated free chlorine with age and the deterioration of the efficiency of chlorine generation with age when the polarity of the electrodes was not as a rule reversed are shown in FIGS. 13 and 14 respectively.

From FIGS. 13 and 14 it can be seen that:

(1) Both the concentration of the generated free chlorine and the efficiency of chlorine generation fell rapidly after the total time of the electrolysis reached 7 hours. When the total time of the electrolysis reached 21 hours, the concentration of the generated free chlorine and the efficiency of chlorine generation were about ⅕ of what they were just after the start of the electrolysis.

(2) Just after the polarity reversal at a total time of the electrolysis of 25.3 hours and just after the polarity reversal at the total time of the electrolysis of 37.3 hours, the concentration of the generated free chlorine increased by about 20%. When the electrolysis was continued with the electrodes maintained in the polarity after the polarity reversal, the concentration of the generated free chlorine showed the same tendency to decrease with passage of time as before the polarity reversal.

The reason why the concentration of the generated free chlorine increased just after the polarity reversal of the electrodes is thought to be that scale adhering to the negative electrode peeled off because of the polarity reversal. Thus, it is thought that electrode polarity reversal is effective for preventing the deterioration of the concentration of the generated free chlorine with age and the deterioration of the efficiency of chlorine generation with age.

Figure 15:
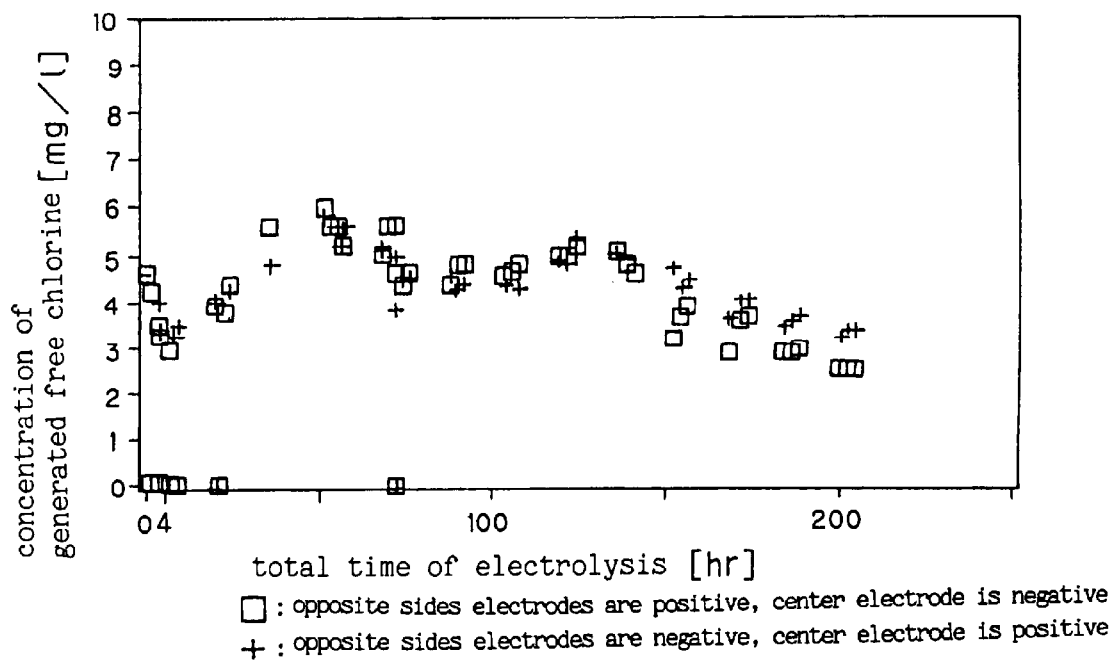
FIG. 15 is a graph showing the deterioration of the concentration of the generated free chlorine with age when the polarity of the electrodes is reversed.
Figure 16:
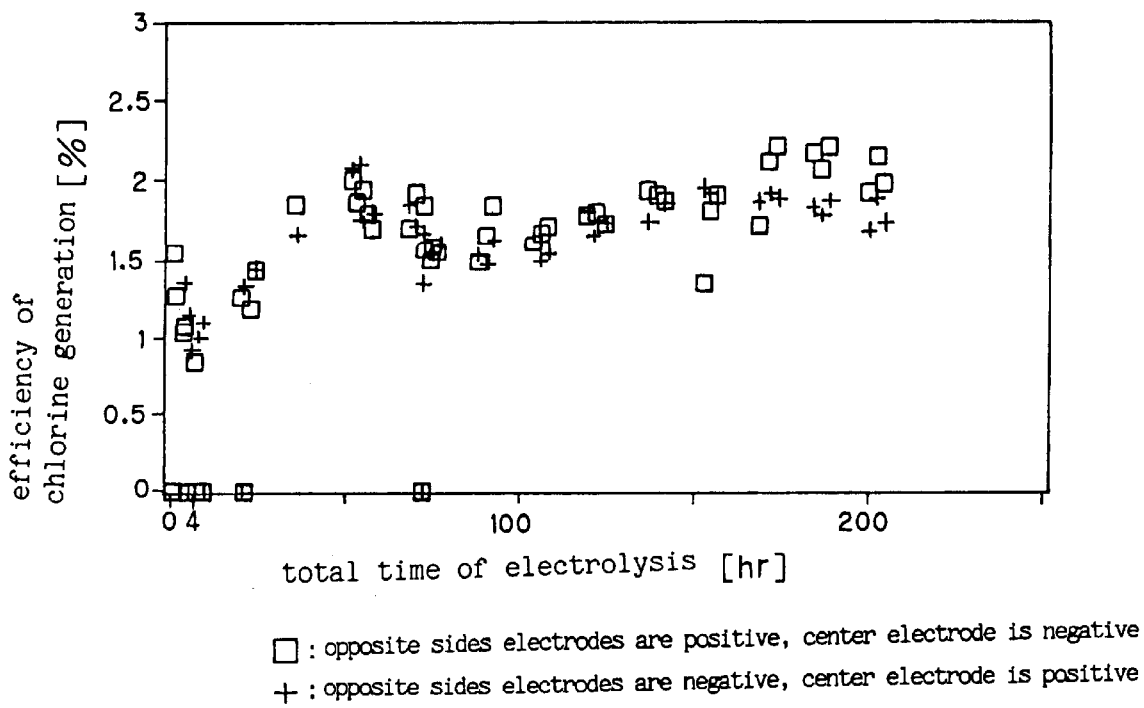
FIG. 16 is a graph showing the deterioration of the efficiency of chlorine generation with age when the polarity of the electrodes is reversed.

The deterioration of the concentration of the generated free chlorine with age and the deterioration of the efficiency of chlorine generation with age when the polarity of the electrodes was reversed are shown in FIGS. 15 and 16 respectively.

From FIGS. 15 and 16 it can be seen that:

(1) Both the concentration of the generated free chlorine and the efficiency of chlorine generation fell rapidly until the total time of the electrolysis reached 4 hours.

Even though the polarity of the electrodes was reversed, the concentration of the generated free chlorine and the efficiency of chlorine generation rapidly decreased with passage of time. The reason for this is thought to be that the simultaneous turning off of the D.C. power supply 6 with the stoppage of the flow of the water caused electrolyzing of the resident water after the stoppage of the flow of the water owing to the discharge of the capacitor installed in the D.C. power supply 6 and the adhesion of the scale to the negative electrode.

(2) After the total time of the electrolysis had reached 4 hours, both the concentration of the generated free chlorine and the efficiency of chlorine generation stayed substantially equal to what they were from just after the start of the electrolysis until the total time of the electrolysis reached 205 hours.

The reason why the concentration of the generated free chlorine and the efficiency of chlorine generation which had been going down, were raised up to substantially the same levels as those just after the start of the electrolysis is thought to be that the turning off of the D.C. power supply 6 at 10 seconds before the stoppage of the flow of the water prevented the electrolyzing of the resident water and the adhesion of scale to the negative electrode, and that the electrode polarity reversal caused the scale adhering to the negative electrode to peel off.

A sterilization system wherein flowing city water is electrolyzed to generate free chlorine and the city water containing the generated free chlorine is supplied to a kitchen to sterilize the outlet port of the kitchen, chopping boards, etc. would probably be continuously operated for 2 minutes at intervals of 12 hours. Assuming the service life of the sterilization system to be 10 years, the total operating time of the sterilization system would be about 240 hours. It is clear from FIGS. 15 and 16 that if the polarity of the electrodes is reversed once every electrolysis and the flow of the water is stopped after the stoppage of the electrolysis, the sterilization system would have sufficient durability for practical use.

III. Test 3

The effect of the composition of the chlorine generating catalyst on the service life of the chlorine generating electrode was investigated.

A. Test Conditions

Electrolyzing tests were carried out on flowing city water using a chlorine generating electrode A constituted of a titanium base plate coated with a 1 μm thick layer of chlorine generating catalyst containing platinum and iridium but not tantalum, and a chlorine generating electrode B constituted of a titanium base plate coated with a 1 μm thick layer of chlorine generating catalyst containing platinum, iridium and tantalum at a weight ratio of 13:55:32. Thus, the effect of the composition of the chlorine generating catalyst on the service life of the chlorine generating electrode was investigated.

The measurement apparatus shown in FIGS. 8 and 9, which is the same as that used in Test 1, was used. However, a switching power supply of 12 V was used as the D.C. power supply 6.

The electrode plates 4 were rectangular and measured 70 mm(L)×50 mm(W)×0.5 mm(T).

Three electrode plates 4 were disposed in the electrolytic cell 3. The distance between adjacent electrodes was set at 0.43 mm. Spacers 9 having a thickness equal to the distance between the electrode plates 4 were inserted into the spaces between adjacent electrode plates 4 to keep the desired electrode spacing. The substantial area of the electrodes excluding the area in contact with the spacers 9 was set at 0.60 dm$^2$/electrode. The test was conducted using the electrode A for all of the three electrode plates 4, or the electrode B for all of the three electrode plates 4.

City water was fed into the electrolytic cell 3 through the inlet port 1 and passed into two passages 5 formed between the three electrode plates 4 at a flow rate of 0.25 dm$^3$/minute per passage. Then, the city water was discharged out of the electrolytic cell 3 through the outlet port 2.

The current density was set at 500 A/m$^2$.

Cycles consisting of five minutes of electrolysis of flowing water and one minute of stoppage of the flow of the water and the electrolysis were repeated 10 times. The electrode polarity was reversed at every stoppage of the electrolysis. At every electrolysis, 0.01 dm$^3$ of the city water discharged out of the electrolytic cell 3 was sampled one minute after the start of the electrolysis. The concentration of the free chlorine in the sampled water was measured by the DPD method. The mean value of 10 measurements was obtained. The concentration of the free chlorine in the city water before the electrolysis was measured by the DPD method and subtracted from the mean value of the concentration of free chlorine in the discharged water. Thus, the concentration of the generated free chlorine was obtained.

B. Test Results

Figure 17:
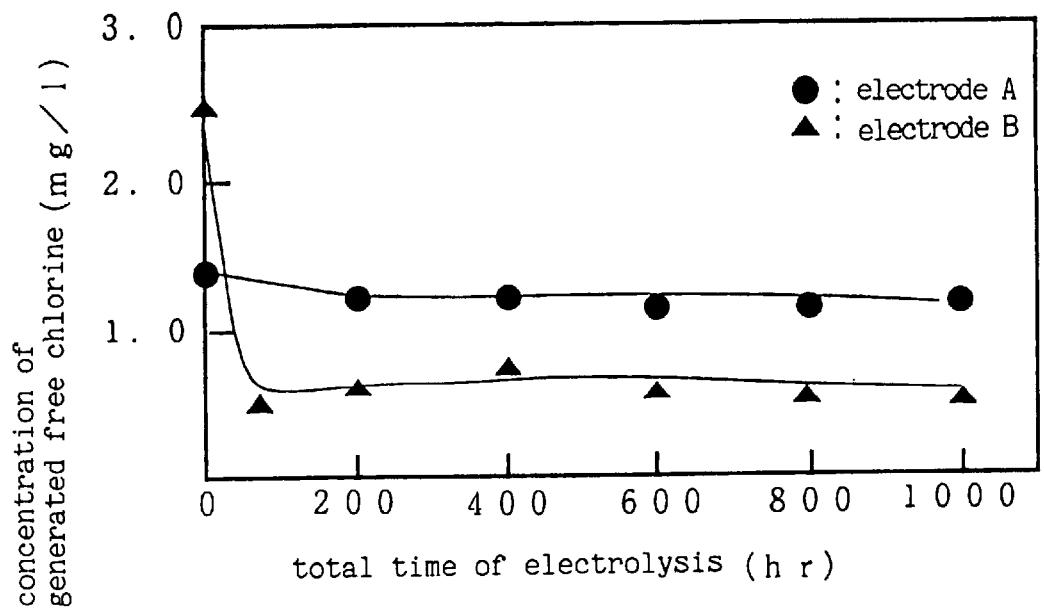
FIG. 17 is a graph showing the difference in the deterioration of the concentration of the generated free chlorine with age between chlorine generating catalysts of different compositions.

The deterioration of the concentration of the generated free chlorine with age is shown in FIG. 17.

It is clear from FIG. 17 that when the electrode B was used, high concentration of the generated free chlorine was achieved at the beginning of the electrolysis but the concentration of the generated free chlorine fell rapidly before the total time of the electrolysis reached 72 hours, while when the electrode A was used, the concentration of the generated free chlorine at the beginning of the electrolysis was lower than that when the electrode B was used but the concentration of the generated free chlorine did not decrease even after the total time of the electrolysis reached 1000 hours. Thus, it is clear that when the chlorine generating catalyst contains platinum and iridium but not tantalum, an electrode exhibiting a long service life can be obtained, and that when the chlorine generating catalyst contains platinum, iridium and tantalum, the tantalum content should preferably be less than 30 weight percent.

IV. Test 4

The effect of the thickness of the layer of chlorine generating catalyst on the concentration of the generated free chlorine was investigated.

A. Test Conditions

Electrolyzing tests were carried out on flowing city water using a chlorine generating electrode constituted of a titanium base plate coated with a layer of chlorine generating catalyst containing platinum and iridium but not tantalum. The thickness of the layer of chlorine generating catalyst was varied. Thus, the effect of the thickness of the layer of chlorine generating catalyst on the concentration of the generated free chlorine was investigated.

The measurement apparatus shown in FIGS. 8 and 9, which is the same as that used in Test 1, was used. However, a switching power supply of 12 V was used as the D.C. power supply 6.

The electrode plates 4 were rectangular and measured 70 mm(L)×50 mm(W)×0.5 mm(T).

Three electrode plates 4 were disposed in the electrolytic cell 3. The distance between adjacent electrodes was set at 0.43 mm. Spacers 9 having a thickness equal to the distance between the electrode plates 4 were inserted into the spaces between the electrode plates 4 to keep the desired electrode spacing. The substantial area of the electrode excluding the area in contact with the spacers 9 was set at 0.60 dm$^2$/electrode. The chlorine generating electrode was used for all of the three electrode plates 4.

City water was fed into -he electrolytic cell 3 through the inlet port 1, and passed into two passages 5 formed between the three electrode plates 4 at a flow rate of 0.25 dm$^3$/minute per passage. Then, the city water was discharged out of the electrolytic cell 3 through the outlet port 2.

The current density was set at 500 A/m$^2$.

Cycles consisting of five minutes of electrolysis of flowing water and one minute of stoppage of the flow of the water and the electrolysis were repeated 10 times. The electrode polarity was reversed at every stoppage of the electrolysis. At every electrolysis, 0.01 dm$^3$ of the city water discharged out of the electrolytic was sampled one minute after the start of the electrolysis. The concentration of the free chlorine in the sampled water was measured by the DPD method. The mean value of 10 measurements was obtained. The concentration of the free chlorine in the city water before the electrolysis was measured by the DPD method and subtracted from the mean value of the concentration of free chlorine in the discharged water. Thus, the concentration of the generated free chlorine was obtained.

B. Test Results

Figure 18:
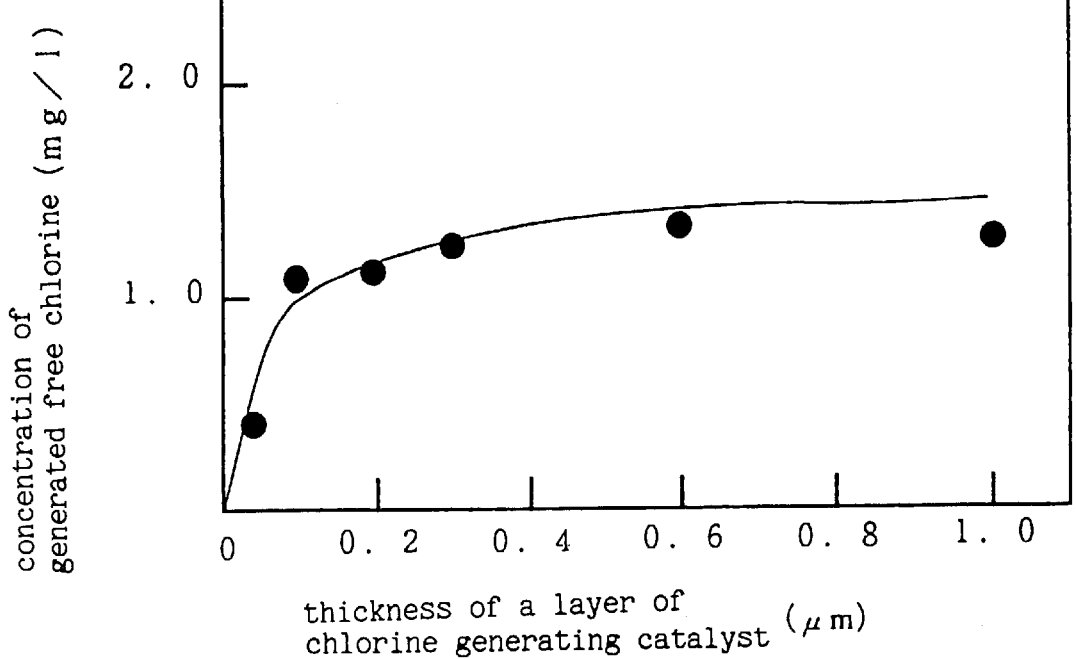
FIG. 18 is a graph showing how the concentration of the generated free chlorine varies with thickness of the layer of chlorine generating catalyst.

The variation of the concentration of the generated free chlorine with thickness of the layer of chlorine generating catalyst is shown in FIG. 18.

It is clear from FIG. 18 that when the thickness of the layer of chlorine generating catalyst reached 0.1 $\mu$m, the concentration of the generated free chlorine reached 1 mg/l, and when the thickness of the layer of chlorine generating catalyst became equal to or larger than 0.2 $\mu$m, the concentration of the generated free chlorine was stably maintained equal to or larger than 1 mg/l. As mentioned earlier, a concentration of the generated free chlorine substantially equal to or larger than 1 mg/l is large enough for sterilizing or preventing the fouling of an outlet port of a kitchen, chopping boards, toilet stools, bath tubs, etc.

V. Test 5

The effect of the current density on the service life of the electrode was investigated.

A. Test Conditions

Electrolyzing tests were carried out on flowing city water using chlorine generating electrode constituted of a titanium base plate coated with a 1 $\mu$m thick layer of chlorine generating catalyst containing platinum and iridium but not tantalum. Thus, the effect of the current density on the service life of the electrode was investigated.

The measurement apparatus shown in FIGS. 8 and 9, which is the same as that used in Test 1, was used. However, a switching power supply of 12 V was used as the D.C. power supply 6.

The electrode plates 4 were rectangular and measured 70 mm(L)×50 mm(W)×0.5 mm(T).

Three electrode plates 4 were disposed in the electrolytic cell 3. The distance between adjacent electrodes was set at 0.43 mm. Spacers 9 having a thickness equal to the distance between the electrode plates 4 were inserted into the spaces between the electrode plates 4 to keep the desired electrode spacing. The substantial area of the electrode excluding the area in contact with the spacers 9 was set at 0.60 dm$^2$/electrode. The chlorine generating electrode was used for all of the three electrode plates 4.

City water was fed into the electrolytic cell 3 through the inlet port 1 and passed into two passages 5 formed between the three electrode plates 4 at a flow rate of 0.25 dm$^3$/minute per passage. Then, the city water was discharged out of the electrolytic cell 3 through the outlet port 2.

The current density was set at 550 A/m² and 1100 A/m².

Cycles consisting of five minutes of electrolysis of flowing water and one minute of stoppage of the flow of the water and the electrolysis were repeated. The electrode polarity was reversed at every electrolysis. The thickness of the chlorine generating electrode was measured at appropriate time intervals.

B. Test Results

Figure 19:
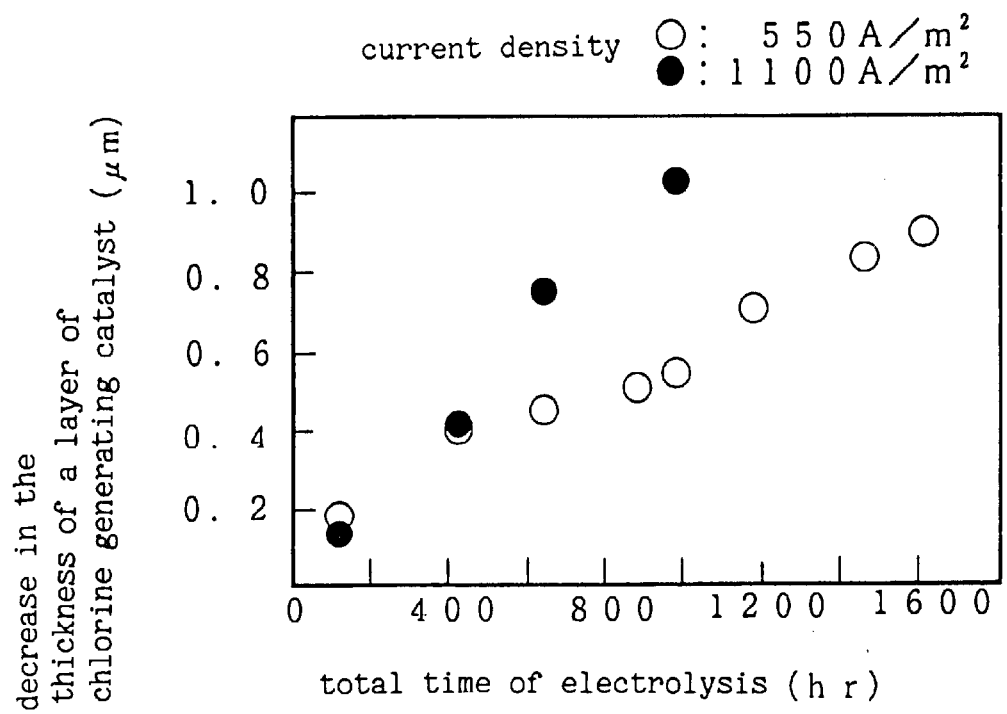
FIG. 19 is a graph showing the difference in the deterioration of the decrease in the thickness of the layer of chlorine generating catalyst with age between different current densities.

The deterioration of the decrease of the thickness of the layer of chlorine generating catalyst with age is shown in FIG. 19.

It is clear from FIG. 19 that when the current density was 1100 A/m², the decrease in the thickness of the layer of chlorine generating catalyst reached 1 μm at a total time of electrolysis of 1000 hours, while when the current density was 550 A/m², the decrease in the thickness of the layer of chlorine generating catalyst was equal to or less than 0.9 μm even at a total time of electrolysis of 1600 hours. Thus, it is clear that when the current density is less than 1100 A/m², the electrode exhibits a long service life.

IV. Test 6

The effect of the frequency of the electrode polarity reversal on electrode service life was investigated.

A. Test Conditions

Electrolyzing tests were carried out on flowing city water using a chlorine generating electrode constituted of a titanium base plate coated with a 1 μm thick layer of chlorine generating catalyst containing platinum and iridium but not tantalum. Thus, the effect of the frequency of electrode polarity reversal on electrode service life was investigated.

The measurement apparatus shown in FIGS. 8 and 9, which is the same as that used in Test 1, was used. However, a switching power supply of 12 V was used as the D.C. power supply 6.

The electrode plates 4 were rectangular and measured 70 mm(L)×50 mm(W)×0.5 mm(T).

Three electrode plates 4 were disposed in the electrolytic cell 3. The distance between adjacent electrodes was set at 0.43 mm. Spacers 9 having a thickness equal to the distance between the electrode plates 4 were inserted into the spaces between the electrode plates 4 to keep the desired electrode spacing. The substantial area of the electrode excluding the area in contact with the spacers 9 was set at 0.60 dm²/electrode. The chlorine generating electrode was used for all of the three electrode plates 4.

City water was fed into the electrolytic cell 3 through the inlet port 1 and passed into two passages 5 formed between the three electrode plates 4 at a flow rate of 0.25 dm³/minute per passage. Then, the city water was discharged out of the electrolytic cell 3 through the outlet port 2.

Cycles consisting of five minutes of electrolysis of flowing water and one minute of stoppage of the flow of the water and the electrolysis were repeated. The frequency of electrode polarity reversal was set at once per electrolysis, and once per 10 repetitions of the electrolysis. The thickness of the chlorine generating electrode was measured at appropriate time intervals.

B. Test Results

Figure 20:
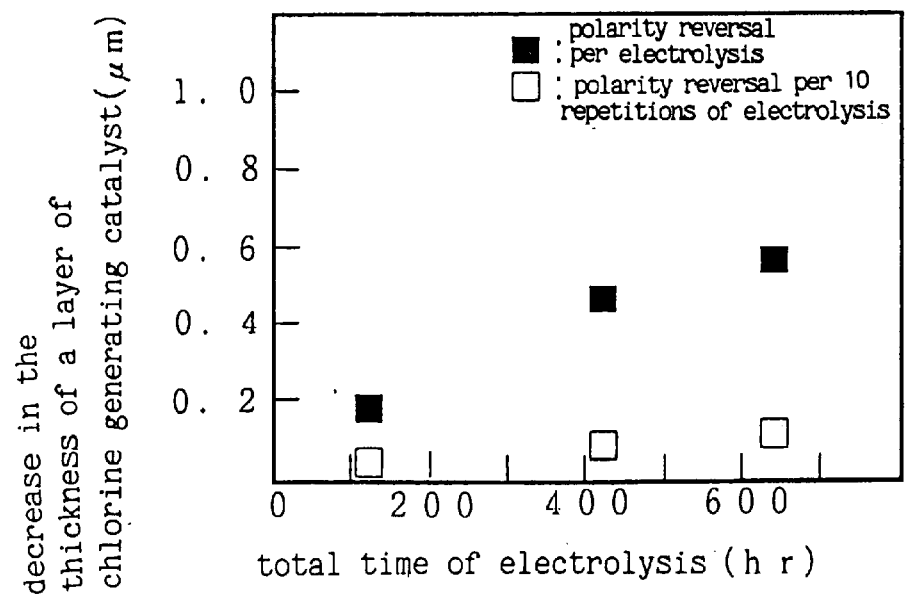
FIG. 20 is a graph showing the difference in the deterioration of the decrease in the thickness of the layer of chlorine generating catalyst with age between different electrode polarity reversal frequencies.

The deterioration of the decrease of the thickness of the layer of chlorine generating catalyst with age is shown in FIG. 20.

It is clear from FIG. 20 that one electrode polarity reversal per 10 repetitions of electrolysis causes less decrease in the thickness of the chlorine generating electrode.

The duration of each electrolysis was set at 5 minutes. Thus, one electrode polarity reversal per electrolysis is equivalent to 12 electrode polarity reversals per 1 hour total time of the electrolysis. For optimum electrode service life, therefore, the frequency of electrode polarity reversal should be less than 12 times per 1 hour total time of the electrolysis.

VII. Test 7

The effects of the structure of the electrolytic cell 3 on the concentration of the generated free chlorine and the efficiency of chlorine generation were investigated.

A. Test Conditions

Electrolyzing tests were carried out on flowing city water using an electrolyzing apparatuses A and B having the electrolytic cell shown in FIGS. 6 and 7 respectively. In apparatus A shown in FIG. 6, the direction of the flow of the liquid flowing into the inlet port 1 and the direction of the flow of the liquid flowing out the outlet port 2, are at right angles to the direction in which the passage 5 formed between the electrode plates 4, 4 extends. In electrolyzing apparatus B having the electrolytic cell shown in FIG. 7, the direction of the flow of the liquid flowing into the inlet port 1, and the direction of the flow of the liquid flowing out the outlet port 2, are in line with the direction in which the passage 5 formed between the electrode plates 4, 4 extends. Thus, the effects of the structure of the electrolytic cell 3 on the concentration of the generated free chlorine and the efficiency of chlorine generation were investigated.

The measurement apparatus shown in FIGS. 8 and 9, which is the same as that used in Test 1, was used for the electrolyzing apparatus A. However, a switching power supply of 12 V was used as the D.C. power supply 6.

The measurement apparatus shown in FIGS. 8 and 9, which is the same as that used in Test 1, was also used for the electrolyzing apparatus B. However, as indicated by broken lines in FIG. 9, the inlet port 1 and the outlet port 2 of the electrolytic cell 3 were disposed at the middle of the height of the electrolytic cell 3. A switching power supply of 12 V was used as the D.C. power supply 6.

The electrode plates 4 were rectangular and measured 70 mm(L)×50 mm(W)×0.5 mm(T).

Two electrode plates 4 were disposed in the electrolytic cell 3.

The distance between the electrodes was set at 0.43 mm. Spacers 9 having a thickness equal to the distance between the electrode plates 4 were inserted into the space between the electrode plates 4 to keep the desired electrode spacing. The substantial area of the electrode excluding the area in contact with the spacers 9 was set at 0.60 dM²/electrode. The chlorine generating electrode was used for both of the electrode plates 4.

City water was fed into the electrolytic cell 3 through the inlet port 1 and passed into the passage 5 formed between the two electrode plates 4 at a flow rate of 0.25 dm³/minute. Then, the city water was discharged out of the electrolytic cell 3 through the outlet port 2.

The current density was set at 500 A/m².

Cycles consisting of five minutes of electrolysis of flowing water and one minute of stoppage of the flow of the water and the electrolysis were repeated 10 times. The electrode polarity was reversed at every stoppage of the electrolysis. At every electrolysis, 0.01 dm³ of the city water discharged out of the electrolytic cell 3 was sampled one minute after the start of the electrolysis. The concentration of the free chlorine in the sampled water was measured by the DPD method. The mean value of 10 measurements was obtained. The concentration of the free chlorine in the city water before the electrolysis was measured by the DPD method and subtracted from the mean value of the concentration of free chlorine in the discharged water. Thus, the concentration of the generated free chlorine was obtained. The efficiency of chlorine generation η was obtained according to the formula III.

B. Test Results

The variation of the concentration of the generated free chlorine with structure of the electrolytic cell 3 and the variation of the efficiency of chlorine generation with structure of the electrolytic cell 3 are shown in Table 2.

It is clear from Table 2 that the electrolyzing apparatus B having the electrolytic cell shown in FIG. 7 achieved higher concentration of the generated free chlorine and higher efficiency of chlorine generation.

VIII Test 8

The effect of the composition of the chlorine generating catalyst on the service life of the chlorine generating electrode was investigated.

A. Test Conditions

Electrolyzing tests were carried out on flowing city water using a chlorine generating electrode C constituted of a titanium base plate coated with a 1 μm thick layer of chlorine generating catalyst containing platinum and iridium at a mole ratio of 70:30, and a chlorine generating electrode D constituted of a titanium base plate coated with a 1 μm thick layer of chlorine generating catalyst containing platinum and iridium at a mole ratio of 80:20. Thus, the effect of the composition of the chlorine generating catalyst on the service life of the chlorine generating electrode was investigated.

The measurement apparatus shown in FIGS. 8 and 9, which is the same as that used in Test 1, was used. However, a switching power supply of 12 V was used as the D.C. power supply 6.

The electrode plates 4 were square and measured 40 mm(L)×40 mm(W)×0.5 mm(T).

Two electrode plates 4 were disposed in the electrolytic cell 3. The distance between the electrodes was set at 0.5 mm. Spacers 9 having a thickness equal to the distance between the electrode plates 4 were inserted into the space between the electrode plates 4 to keep the desired electrode spacing. The substantial area of the electrodes excluding the area in contact with the spacers 9 was set at 0.14 dm² per electrode. The chlorine generating electrode was used for both electrode plates 4.

City water was fed into the electrolytic cell 3 through the inlet port 1 and passed into the passage 5 formed between the two electrode plates 4 at a flow rate of 0.5 dm³/minute. Then, the city water was discharged out of the electrolytic cell 3 through the outlet port 2.

The current density was set at 550 A/m².

Cycles consisting of five minutes of electrolysis of flowing water and one minute of stoppage of the flow of the water and the electrolysis were repeated 10 times. The electrode polarity was reversed at every electrolysis.

Deterioration of the voltage characteristic across the electrodes with age was checked to detect the service life of the electrodes. Since the specific electric conductivity of the city water flowing into the electrolytic cell varies to some extent, the voltage across the electrodes measured by the voltmeter was corrected to that in the case where the specific electric conductivity ρ is ρ=150 μS/cm. The deterioration of the voltage characteristic across the electrodes after the correction was investigated.

When electrodes begin to convert into non-conductors, the voltage across the electrodes sharply increases. Thus, the service life of the electrodes can be detected by checking the total time of the electrolysis before a sharp increase in the voltage across the electrodes begins.

B. Test Results

Figure 21:
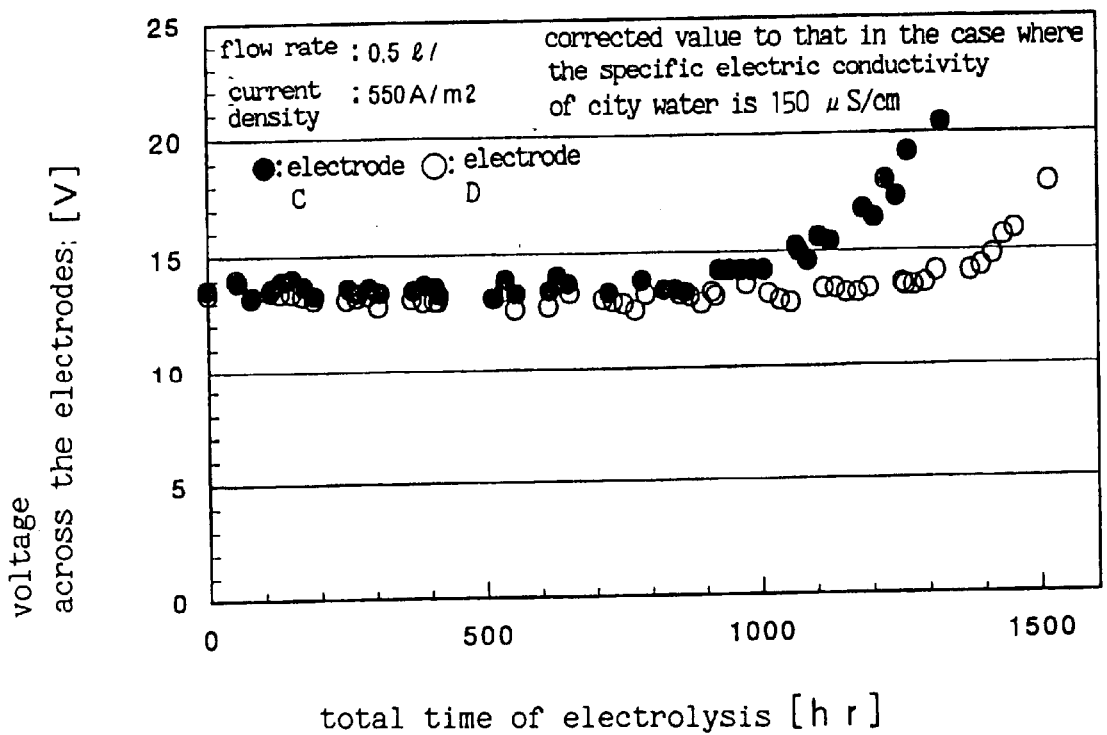
FIG. 21 is a graph showing the difference in the deterioration in the voltage across the electrodes with age between chlorine generating catalysts of different compositions.

The deterioration of the voltage characteristic across the electrodes with age is shown in FIG. 21.

It is clear from FIG. 21 that when the electrode C was used, a sharp increase in the voltage across the electrodes began when the total time of the electrolysis reached 1000 hours, while when the electrode D was used, a sharp increase in the voltage across the electrodes began when the total time of the electrolysis reached 1400 hours. Thus, it is clear that a chlorine generating catalyst containing platinum and iridium achieves a long service life. It is thought that the adding of the platinum prevents the desorption of a chlorine generating catalyst such as iridium oxide etc. caused by the application of voltage across the electrodes. It is clear that an electrode exhibiting a long service life can be obtained when the mole ratio of platinum to the sum of platinum and iridium in the chlorine generating catalyst is equal to or larger than 70%, preferably equal to or larger than 80%.

Figure 22:
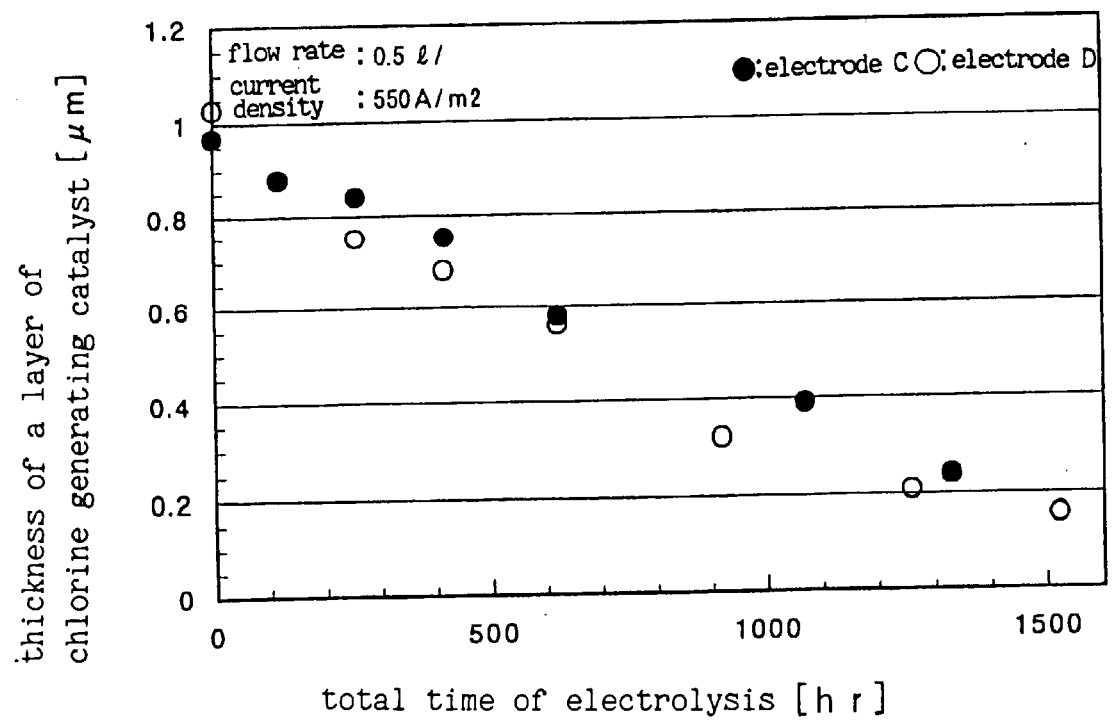
FIG. 22 is a graph showing the difference in the deterioration of the thickness of the layer of chlorine generating catalyst with age between chlorine generating catalysts of different compositions.
Figure 23:
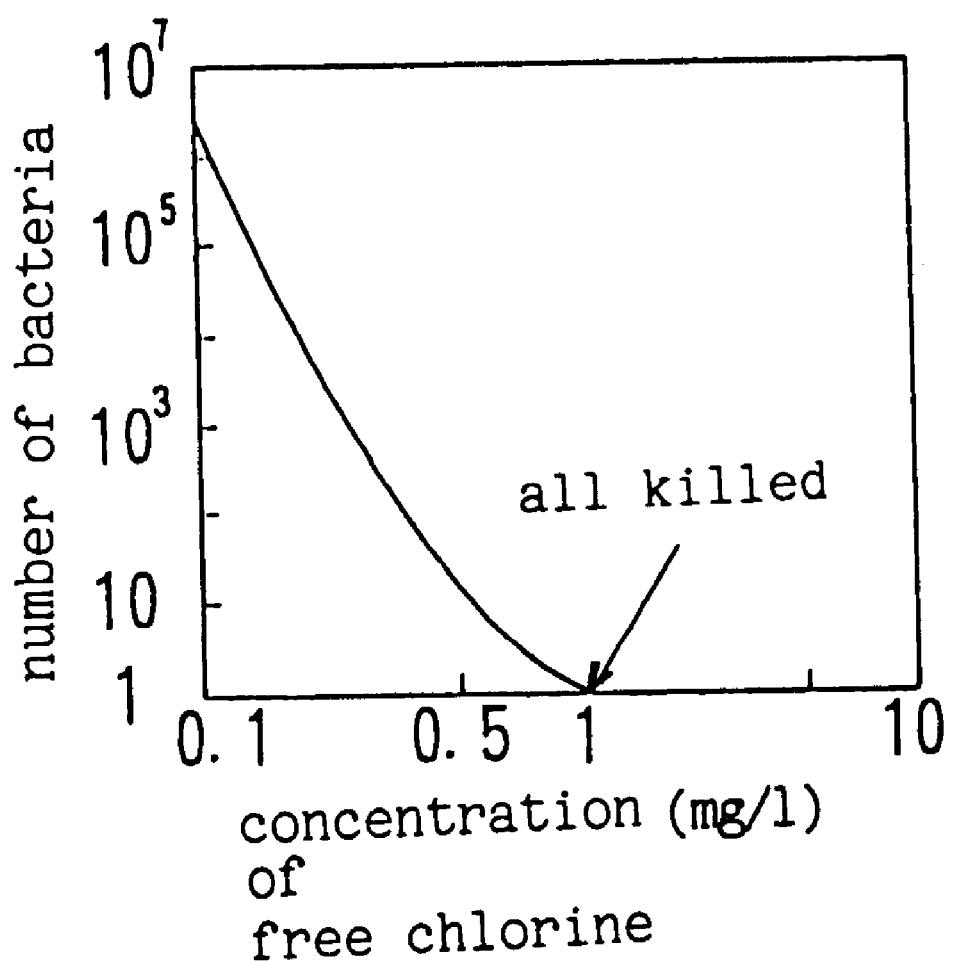
FIG. 23 is a graph showing how the bactericidal activity varies with hypochlorous acid concentration.

The deterioration of the thickness of the chlorine generating catalyst with age is shown in FIG. 22.

Judging from FIG. 22, it is thought that the service life of the electrode increases as the ratio of platinum increases because of the following two reasons.

(1) The threshold value of the thickness of the layer of chlorine generating catalyst which causes the conversion of the electrode into a non-conductor decreases as the ratio of platinum increases.

It is clear from FIG. 22 that when the electrode C, wherein the mole ratio of platinum was 70%, was used, the thickness of the layer of the chlorine generating catalyst was 0.4 μm when the total time of the electrolysis reached 1000 hours and the sharp increase in voltage across the electrodes began, while, when the electrode D, wherein the mole ratio of platinum is 80%, was used, the thickness of the layer of the chlorine generating catalyst was equal to or less than 0.2 μm when the total time of the electrolysis reached 1400 hours and the sharp increase of voltage across the electrodes began.

(2) After the thickness of the chlorine generating catalyst has decreased to some extent, the resistance of the chlorine generating catalyst to desorption increases with increasing platinum content.

It is clear from FIG. 22 that when the electrode C, wherein the mole ratio of platinum was 70%, was used, the rate of decrease in the thickness of the layer of chlorine generating catalyst was substantially constant, while, when the electrode D, wherein the mole ratio of platinum was 80%, was used, the rate of decrease in the thickness of the layer of chlorine generating catalyst declined after the thickness of the layer of the chlorine generating catalyst decreased to about 0.3 μm.

INDUSTRIAL APPLICABILITY

The electrolyzing apparatus and the electrolyzing method for electrolyzing flowing water in accordance with the present invention enable easy sterilization of an outlet port of a kitchen, in an office or in the home, kitchen utensils such as chopping boards, bath rooms, toilet stools etc., and also make it possible to operate and maintain the sterilizing apparatus easily.

TABLE 1

| electrode spacing [mm] | flow rate [l/min] | voltage [V] | electric current [A] | electric power [W] | electrode surface area [m²] | current density [A/m²] | concentration of free chlorine [mg/l] | concentration of generated free chlorine [mg/l] | efficiency of chlorine generation [%] | concentration of free chlorine in city water [mg/l] |
|---|---|---|---|---|---|---|---|---|---|---|
| 0.43 | 0.48 | 4.10 | 1.00 | 4.10 | 0.006 | 167 | 0.93 | 0.25 | 0.54 | 0.68 |
| 0.43 | 0.48 | 5.56 | 2.01 | 11.18 | 0.006 | 335 | 1.88 | 1.20 | 1.30 | — |
| 0.43 | 0.48 | 6.84 | 3.00 | 20.52 | 0.006 | 500 | 3.00 | 2.32 | 1.68 | — |
| 0.43 | 0.48 | 8.20 | 4.00 | 32.80 | 0.006 | 667 | 4.00 | 3.32 | 1.80 | — |
| 0.43 | 0.48 | 11.56 | 6.00 | 69.36 | 0.006 | 1000 | 4.50 | 3.82 | 1.38 | — |
| 0.86 | 0.48 | 6.98 | 0.50 | 3.49 | 0.003 | 167 | 0.83 | 0.15 | 0.65 | 0.68 |
| 0.86 | 0.52 | 10.62 | 1.00 | 10.62 | 0.003 | 333 | 1.30 | 0.62 | 1.46 | — |
| 0.86 | 0.48 | 13.19 | 1.50 | 19.79 | 0.003 | 500 | 2.10 | 1.42 | 2.06 | — |
| 0.86 | 0.28 | 15.61 | 2.01 | 31.38 | 0.003 | 670 | 2.90 | 2.22 | 2.40 | — |
| 0.86 | 0.48 | 21.93 | 3.00 | 65.79 | 0.003 | 1000 | 3.50 | 2.82 | 2.04 | — |
| 0.86 | 0.26 | 6.52 | 0.50 | 3.26 | 0.003 | 167 | 1.00 | 0.29 | 0.68 | 0.71 |
| 0.86 | 0.26 | 9.29 | 1.00 | 9.29 | 0.003 | 333 | 2.15 | 1.44 | 1.70 | — |
| 0.86 | 0.26 | 11.73 | 1.50 | 17.60 | 0.003 | 500 | 3.10 | 2.39 | 1.88 | — |
| 0.86 | 0.26 | 14.41 | 2.00 | 28.82 | 0.003 | 667 | 3.90 | 3.19 | 1.88 | — |
| 0.86 | 0.26 | 21.94 | 3.00 | 65.82 | 0.003 | 1000 | 4.50 | 3.79 | 1.49 | — |
| 0.19 | 0.48 | 2.90 | 1.00 | 2.90 | 0.006 | 167 | 0.74 | 0.02 | 0.04 | 0.72 |
| 0.19 | 0.48 | 3.71 | 2.00 | 7.42 | 0.006 | 333 | 1.02 | 0.30 | 0.33 | — |
| 0.19 | 0.48 | 4.56 | 3.00 | 13.68 | 0.006 | 500 | 1.52 | 0.80 | 0.58 | — |
| 0.19 | 0.48 | 5.57 | 4.00 | 22.28 | 0.006 | 667 | 2.06 | 1.34 | 0.73 | — |
| 0.19 | 0.48 | 7.59 | 6.00 | 45.54 | 0.006 | 1000 | 3.10 | 2.38 | 0.86 | — |
| 0.19 | 0.48 | 9.60 | 8.00 | 76.80 | 0.006 | 1333 | 3.90 | 3.18 | 0.86 | — |

TABLE 2

| measured items | electrolyzing apparatus A | electrolyzing apparatus B |
|---|---|---|
| concentration of generated free chlorine (mg/l) | 1.99 | 2.37 |
| efficiency of chlorine generation (%) | 3.31 | 3.95 |

We claim:

1. An electrolyzing apparatus for producing water having bactericidal activity from flowing city water, well water, or industrial water, without adding chlorine compounds to the flowing eater, comprising:

non-barrier electrolytic cell;

at least two electrode plates separated by a distance of greater than or equal 0.2 mm and less than 0.5 mm, disposed within the cell and defining a passage therebetween;

a voltage sources connected to the electrode plates for supplying a voltage across the electrode plates at a current density of more than 500 A/m² and less than 1100 A/m²;

an inlet port communicating with the passage for supplying flowing city water, well water, or industrial water to the passage, without adding electrolytes to the flowing water; and an outlet port communicating with the passage for supplying water having bactericidal activity comprising electrolyzed flowing water from the passage without recirculation through said passage;

wherein one of said electrode plates is a positive electrode, another of said electrode plates is a negative electrode and at least the positive electrode is a chlorine-generating electrode, and wherein said passage defined between the electrode plates has a cross-sectional area adjacent said outlet port 1.01 times or greater than a cross-sectional area of said passage adjacent said inlet port.

2. An electrolyzing apparatus according to claim 1, wherein said chlorine generating-electrode comprises a conductive material plate coated with a layer of chlorine-generating catalyst comprising platinum and iridium in an amount wherein the mole ratio of platinum to the sum of platinum and iridium is more than or equal to 70%.

3. An electrolyzing apparatus according to claim 2, wherein the thickness of said layer of chlorine-generating catalyst is greater than or equal to 0.1 μm and less than or equal to 1.0 μm.

4. An electrolyzing apparatus according to claim 1, wherein said chlorine-generating electrode comprises a conductive material plate coated with a layer of chlorine-generating catalyst comprising platinum, iridium and tantalum in an amount wherein the ratio of tantalum to the sum of platinum, iridium and tantalum is less than 30 weight %.

5. An electrolyzing apparatus according to claim 4, wherein the thickness of said layer of chlorine-generating catalyst is greater than or equal to 0.1 μm and less than or equal to 1.0 μm.

6. An electrolyzing apparatus according to claim 1, further comprising a plurality of spacers for separating said electrode plates and wherein said spacers comprise a material selected from polytetrafluoroethylene, polypropylene hexafluoride, trifluoroethylene, trifluorochloroethylene, tetrafluorosilane, and siloxane fluoride.

7. An electrolysing apparatus according to claim 1, further comprising a plurality of spacers for separating said electrode plates, wherein said spacers comprise a material containing a tetrafluoro radical.

8. An electrolyzing apparatus according to claim 1, wherein said electrode plates are coated with a non-conductive material at a portion adjacent said outlet port.

9. An electrolyzing apparatus according to claim 1, wherein said electrode plates are coated with a non-conductive material at a portion adjacent said outlet port.

10. A method for producing water having bactericidal activity by electrolyzing flowing city water, well water, or industrial water, without adding chlorine compounds to the flowing water, using an electrolyzing apparatus comprising:

a non-barrier electrolytic cell;

at least two electrode plates separated by a distance of greater than or equal to 0.2 mm and less than 0.5 mm, disposed within the cell and defining a passage therebetween;

a voltage source connected to the electrode plates for supplying a voltage across the electrode plates;

an inlet port communicating with the passage for supplying flowing city water, well water, or industrial water without adding salt to the flowing water; and an outlet port communicating with the passage for supplying water having bactericidal activity comprising electrolyzed flowing water from the passage without recirculation through the passage;

wherein one of solid electrode plates is a positive electrode, another of said electrode plates is a negative electrode, and at least the positive electrode is a chlorine-generating electrode; and wherein said passage defined between the electrode plates has a cross-sectional area adjacent said outlet port 1.01 times or greater than a cross-sectional area of said passage adjacent said inlet port, said method comprising the steps of:
(1) supplying flowing city water, well water, or industrial water into the inlet port without adding electrolytes;
(2) applying voltage across said electrode plates at a current density of more than 500 A/m$^2$ and less than 1100 A/m$^2$; and
(3) electrolyzing the flowing water to produce water having bactericidal activity, and
(4) supplying the water having bactericidal activity from the outlet port without recirculating the water having bactericidal activity through the passage.

11. A method of claim 10, wherein said step of supplying flowing city water is continued until a prescribed length of time after said step of electrolyzing has stopped.

12. A method of claim 10, further comprising the step of reversing the polarity of said voltage once per 10 or so repetitions of electrolysis of said flowing water.

13. A method of claim 10, wherein said step of electrolyzing is carried out at a water temperature of more than room temperature and less than 50° C.

14. An electrolysing apparatus according to claim 10, further comprising a plurality of spacers for separating said electrode plates, wherein said spacers comprise a material containing a tetrafluoro radical.

15. An electrolyzing apparatus according to claim 14, wherein said electrode plates are coated with a non-conductive material at a portion adjacent said outlet port.

16. An electrolyzing apparatus according to claim 10, wherein said electrode plates are coated with a non-conductive material at a portion adjacent said outlet port.

17. An electrolyzing apparatus for producing water having bactericidal activity from flowing city water, well water, or industrial water, without adding chlorine compounds to the flowing water, comprising:

a non-barrier electrolytic cell;

at least two electrode plates separated by a distance greater than or equal to 0.2 mm and less than 0.5 mm, disposed within the cell and defining a passage therebetween;

a voltage source connected to the electrode plates for supplying a voltage across the electrode plates at a current density of more than 500 A/m$^2$ and less than 1100 A/m$^2$;

an inlet port communicating with the passage for supplying flowing city water, well water, or industrial water to the passage, without adding electrolytes to the flowing water; and an outlet port communicating with the passage for supplying water having bactericidal activity comprising electrolyzed flowing water from the passage without recirculation through said passage;

wherein one of said electrode plates is a positive electrode, another of said electrode plates is a negative electrode and at least the positive electrode is a chlorine-generating electrode, and wherein said electrode plates are coated with a non-conductive material at a portion adjacent said inlet port and at a portion adjacent said outlet port.

18. An electrolysing apparatus according to claim 17, further comprising a plurality of spacers for separating said electrode plates, wherein said spacers comprise a material containing a tetrafluoro radical.

19. An electrolysing apparatus according to claim 18, wherein said passage defined between the electrode plates has a cross-sectional area adjacent said outlet port 1.01 times or greater than a cross sectional area of said passage adjacent said inlet port.

20. An electrolysing apparatus according to claim 17, wherein said passage defined between the electrode plates has a cross-sectional area adjacent said outlet port 1.01 times or greater than a cross sectional area of said passage adjacent said inlet port.

21. A method for producing water having bactericidal activity by electrolyzing flowing city water, well water, or industrial water containing a very small amount of chlorine ions, without adding electrolytes to the flowing water, using an electrolyzing apparatus comprising:

a non-barrier electrolytic cell;

at least two electrode plates separated by a distance of greater than or equal to 0.2 mm and less than 0.5 mm, disposed within the cell and defining a passage therebetween;

a voltage source connected to the electrode plates for supplying a voltage across the electrode plates;

an inlet port communicating with the passage for supplying flowing city water, well water, or industrial water without adding salt to the flowing water; and an outlet port communicating with the passage for supplying water having bactericidal activity comprising electrolyzed flowing water from the passage without recirculation through the passage; and wherein one of said electrode plates is a positive electrode, another of said electrode plates is a negative electrode, and at least the positive electrode is a chlorine-generating electrode, and wherein said electrode plates are coated with a non-conductive material at a portion adjacent said inlet port and at a portion adjacent said outlet port, said method comprising the steps of:
(1) supplying flowing city water, well water, or industrial water into the inlet port without adding electrolytes;
(2) applying voltage across said electrode plates at a current density of more than 500 A/m$^2$ and less than 1100 A/m$^2$; and
(3) electrolyzing the flowing water to produce water having bactericidal activity, and supplying the water having bactericidal activity from the outlet port without recirculating the water having bactericidal activity through the passage.

22. An electrolysing apparatus according to claim 21, further comprising a plurality of spacers for separating said electrode plates, wherein said spacers comprise a material containing a tetrafluoro radical.

23. An electrolysing apparatus according to claim 22, wherein said passage defined between the electrode plates has a cross-sectional area adjacent said outlet port 1.01 times or greater than a cross sectional area of said passage adjacent said inlet port.

24. An electrolysing apparatus according to claim 21, wherein said passage defined between the electrode plates has a cross-sectional area adjacent said outlet port 1.01 times or greater than a cross sectional area of said passage adjacent said inlet port.

* * * * *